(12) United States Patent
Muzik et al.

(10) Patent No.: US 6,579,455 B1
(45) Date of Patent: Jun. 17, 2003

(54) FILTER AND VALVE APPARATUS

(75) Inventors: Tom Muzik, Thousand Oaks, CA (US); John W. Vickers, Simi Valley, CA (US); John Cannistra, Thousand Oaks, CA (US)

(73) Assignee: PTI Advanced Filtration, Oxnard, CA (US)

( * ) Notice: Subject to any disclaimer, the term of this patent is extended or adjusted under 35 U.S.C. 154(b) by 0 days.

(21) Appl. No.: 09/580,529

(22) Filed: May 30, 2000

Related U.S. Application Data

(60) Provisional application No. 60/152,924, filed on Sep. 9, 1999, and provisional application No. 60/192,360, filed on Mar. 27, 2000.

(51) Int. Cl.[7] .......................................... B01D 35/157
(52) U.S. Cl. .................. 210/234; 210/418; 210/443; 137/628.18; 251/149.9
(58) Field of Search .................................. 210/232, 234, 210/235, 440, 443, 444, 249, 418, 85; 251/149.9; 137/625.18; 285/124.1, 124.4, 124.5

(56) References Cited

U.S. PATENT DOCUMENTS

| 1,840,883 A | * | 1/1932 | Bretcher ..................... 210/232 |
|---|---|---|---|
| 3,399,776 A | | 9/1968 | Knuth |
| 5,380,432 A | * | 1/1995 | Brandt ..................... 210/243 |
| 5,643,446 A | | 7/1997 | Clausen et al. |
| 5,914,037 A | | 6/1999 | Yen |
| 6,048,454 A | * | 4/2000 | Jenkins ..................... 210/172 |

FOREIGN PATENT DOCUMENTS

| DE | 2326212 | 12/1974 |
|---|---|---|
| FR | 2583301 | 12/1986 |

* cited by examiner

Primary Examiner—Matthew O. Savage
(74) Attorney, Agent, or Firm—Pillsbury Winthrop LLP

(57) ABSTRACT

A filter canister is disclosed that includes a main body having a top. An inlet port is positioned on the top of the main body and an outlet port also positioned on the top of the main body, offset from the inlet port by a predetermined distance. A filter cartridge is positioned within the main body that has an outlet end that sealingly engages the outlet port. An inlet port identifier is associated with the inlet port, and an outlet port identifier is associated with the outlet port. A valve is also disclosed that operates in connection with the filter canister.

12 Claims, 25 Drawing Sheets

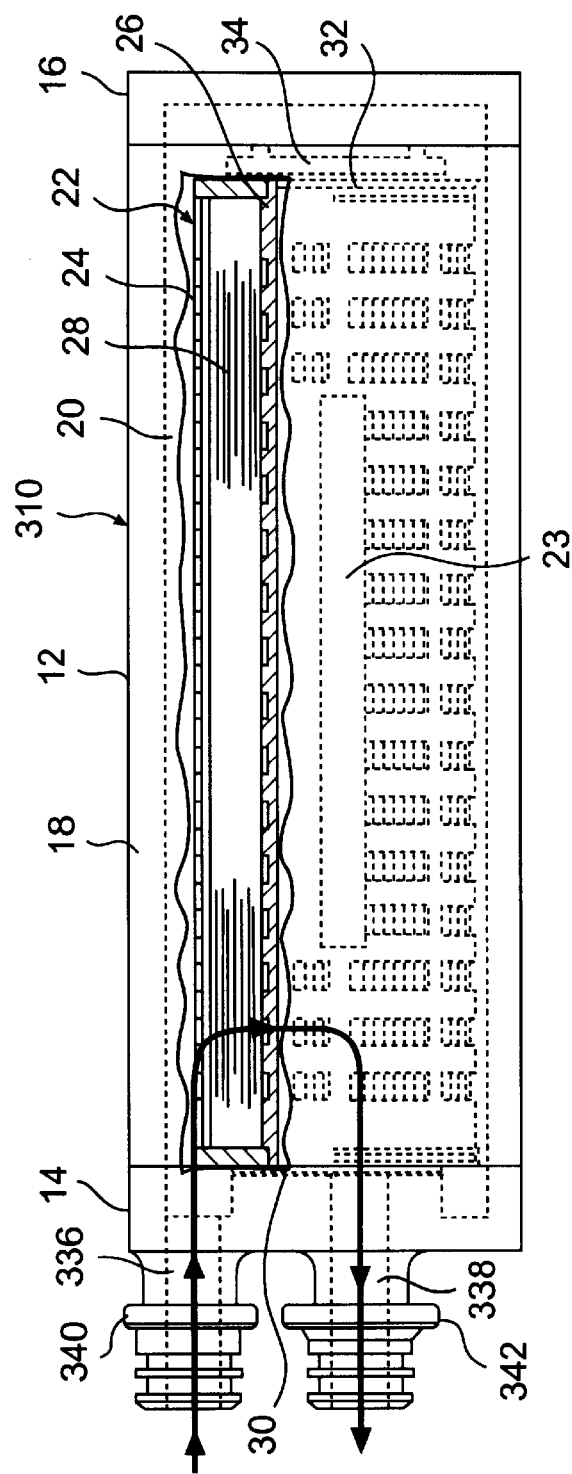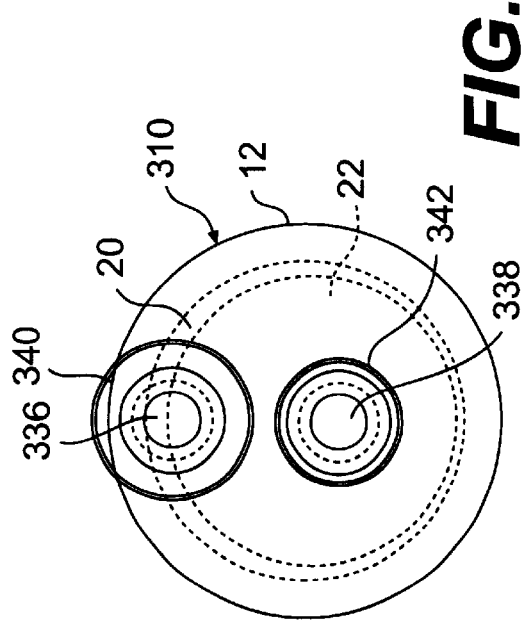

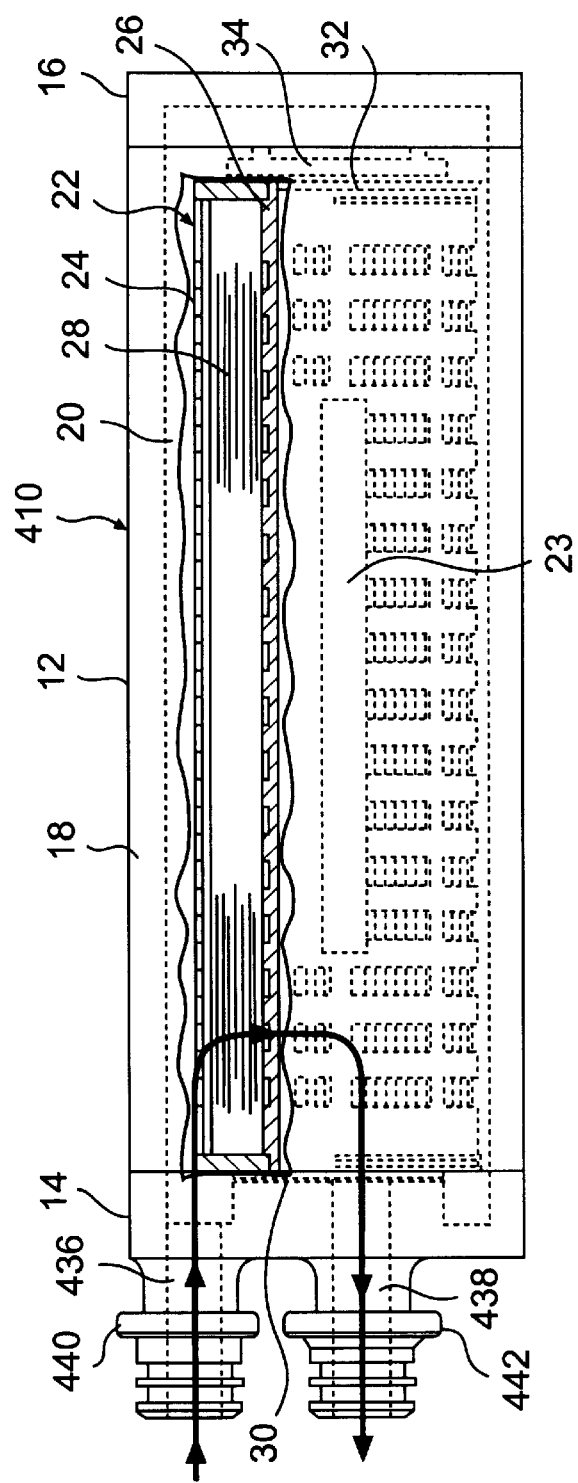
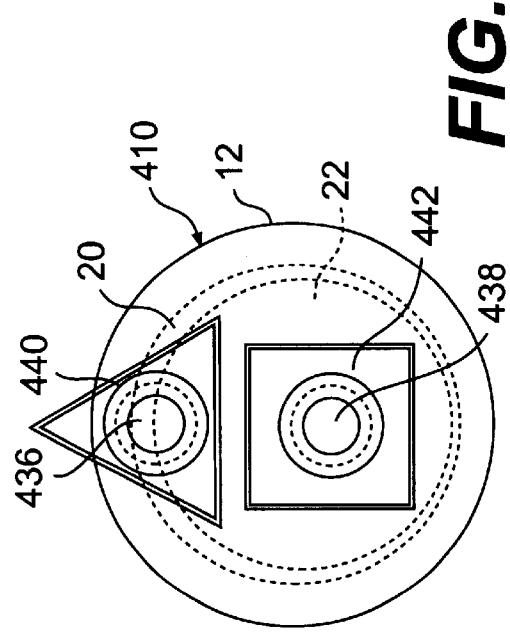

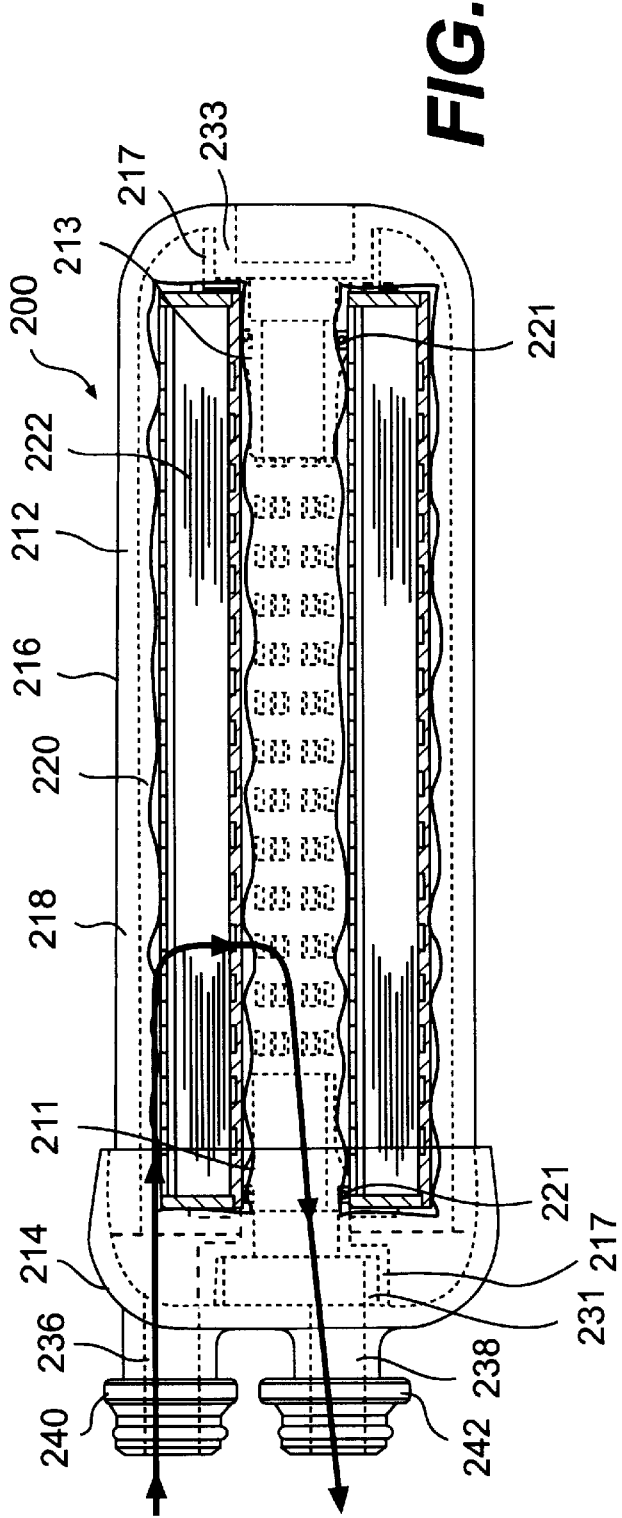

FILTER AND VALVE APPARATUS

This application claims the benefit of the filing dates of U.S. provisional application No. 60/152,924 filed on Sep. 9, 1999 and U.S. Provisional application No. 60/192,360 filed on Mar. 27, 2000.

FIELD OF THE INVENTION

The present invention concerns a filter and valve apparatus. More specifically, the present invention concerns an encapsulated filter that cooperates with an easy shut-off valve to permit rapid replacement of the encapsulated filter. The filter and valve assembly of the present invention are designed to prevent or minimize the spillage of the filtration medium during the filter exchange operation.

BACKGROUND OF THE INVENTION

Filtration systems known in the prior art generally include a cylindrical housing into which a cylindrical filter is placed to filter particulate materials from fluids such as water. In such prior art systems, in order to replace a clogged or dirty filter, it is first necessary to shut off the fluid supply to the filter housing, open the housing and replace the filter. Not only is this operation time consuming, it usually results in leakage of fluid when the housing is opened. Accordingly, a need has developed for a filter system that permits rapid exchange of the filter element without the associated spillage of fluid from the filter housing. This is particularly desirable in situations where the filter is replaced in a sterile environment, such as an operating room in a hospital or such as a clean room in a manufacturing facility, where any spilled filtration media must be cleaned up according to rigid procedures.

SUMMARY OF THE INVENTION

The present invention overcomes the problems with the prior art by providing a self-contained, replaceable filter cartridge that can be quickly and easily removed and replaced from the fluid lines connected thereto.

To accomplish this, the present invention provides a valve that connects a filter cartridge to the fluid being filtered. The valve design permits the cartridge to be quickly replaced without spilling fluid into the environment by providing fluid cut-off upon rotation of filter and part of the valve head assembly. The cartridge may be either a completely disposable type or it may have a construction where the housing may be opened to provide access to an internal, disposable filter.

In accordance with the teachings of the present invention, a filter canister is provided having a main body with a top. An inlet port is positioned on the top of the main body along with an outlet port that is displaced from the inlet port by a predetermined distance. A filter cartridge is positioned within the main body with an outlet end that sealingly engages the outlet port. An inlet port identifier is associated with the inlet port and an outlet port identifier is associated with the outlet port.

The present invention further provides that the inlet port identifier be a flange positioned on the inlet port with a first diameter. The outlet port identifier on the outlet port is a flange with a second diameter. The first diameter can be larger than the second diameter or vice versa.

Alternatively, the inlet port identifier may be a flange with a first shape. The outlet flange identifier may be a flange with a second shape. To differentiate between the inlet port and the outlet port, the flanges may be of different shapes.

The present invention also provides for a valve having an upper plate with inlet and outlet ports. A receptacle disk is rotatably connected to the upper plate and also has inlet and outlet ports. The receptacle disk inlet and outlet ports fluidly communicate with the upper plate inlet and outlet ports when the receptacle disk in a first orientation with respect to the upper plate. The inlet and outlet ports do not fluidly communicate with one another when the receptacle plate is in a second orientation with respect to the upper plate. A lower disk has a cammed surface that permits access to the receptacle disk inlet and outlet ports when the receptacle disk is in the second orientation but prevents access to the receptacle inlet and outlet ports when the receptacle disk is in the first orientation.

In further accordance with the teachings of the present invention, the lower disk is connected to the upper plate in fixed relation thereto. The receptacle disk includes an inlet port identifier associated with the receptacle disk inlet port and an outlet port identifier associated with the receptacle disk outlet port. The inlet port identifier is a first flange receiving portion with a first diameter. The outlet port identifier comprises a second flange receiving portion with a second diameter.

In still further accordance with the teachings of the present invention, the first diameter is greater than the second diameter. Alternatively, the second diameter is greater than the first diameter.

According to the present invention, the inlet port identifier may alternatively have a first flange receiving portion with a first shape and a second flange receiving portion with a second shape. The first shape differs from the second shape.

According to still another teaching of the present invention, the inlet port identifier may comprise a diameter of the receptacle disk inlet port and the outlet port identifier may comprise a diameter of the receptacle disk outlet port. The diameter of the receptacle disk inlet port may be greater than the diameter of the receptacle disk outlet port or vice versa.

In still another embodiment of the present invention, a filter and valve assembly are provided where the filter has a main body with a top. Inlet and outlet ports are positioned on top of the main body and are offset from one another a predetermined distance. A filter cartridge, positioned within the main body, has an outlet end sealingly engaging the outlet port. A valve is also provided that has an upper plate with an inlet port and an outlet port. A receptacle disk, rotatably connected to the upper plate, has an inlet and an outlet port. The receptacle disk inlet and outlet ports fluidly communicate with the upper plate inlet and outlet ports when the receptacle disk is in a first orientation with respect to the upper plate. The receptacle disk inlet and outlet ports do not fluidly communicate with one another when the receptacle disk is in a second orientation with respect to the upper plate. A lower disk has a cammed surface that permits access to the receptacle disk inlet and outlet ports when the receptacle disk is in the second orientation and prevents access to the receptacle inlet and outlet ports when the receptacle disk is in the first orientation. The assembly also includes an inlet port identifier associated with the filter canister inlet port and the receptacle inlet port, where the inlet port identifier permits the filter canister inlet port to fluidly engage the receptacle disk inlet port. Also, the assembly includes an outlet port identifier associated with the filter canister outlet port and the receptacle disk outlet port where the outlet port identifier permits the filter canister outlet port to fluidly engage the receptacle disk outlet port.

Another object of the present invention is to provide a filter and valve assembly where the inlet port identifier is a first flange on the filter canister inlet with a first diameter and a first flange receiving portion on the receptacle disk inlet port for engaging the first flange. The outlet port identifier has a second flange on the filter canister outlet port with a second diameter and a second flange receiving portion on the receptacle disk outlet port for engaging the second flange. The flanges may be of differing sizes or shapes, as described above.

BRIEF DESCRIPTION OF THE DRAWINGS

FIG. 3 is a partial cross-sectional view of a second embodiment of a filter cartridge according to the teachings of the present invention as illustrated in FIG. 1;

FIG. 4 is an end view illustration of the filter cartridge illustrated in FIG. 3;

FIG. 5 is a partial cross-sectional view of a third embodiment of a filter cartridge according to the teachings of the present invention;

FIG. 6 is an end view illustration of the filter cartridge illustrated in FIG. 5;

FIG. 33 is a partial cross-sectional view of another embodiment of the filter of the present invention;

FIG. 34 is a top view of the filter shown in FIG. 32;

DESCRIPTION OF THE PREFERRED EMBODIMENTS

Figure 1:
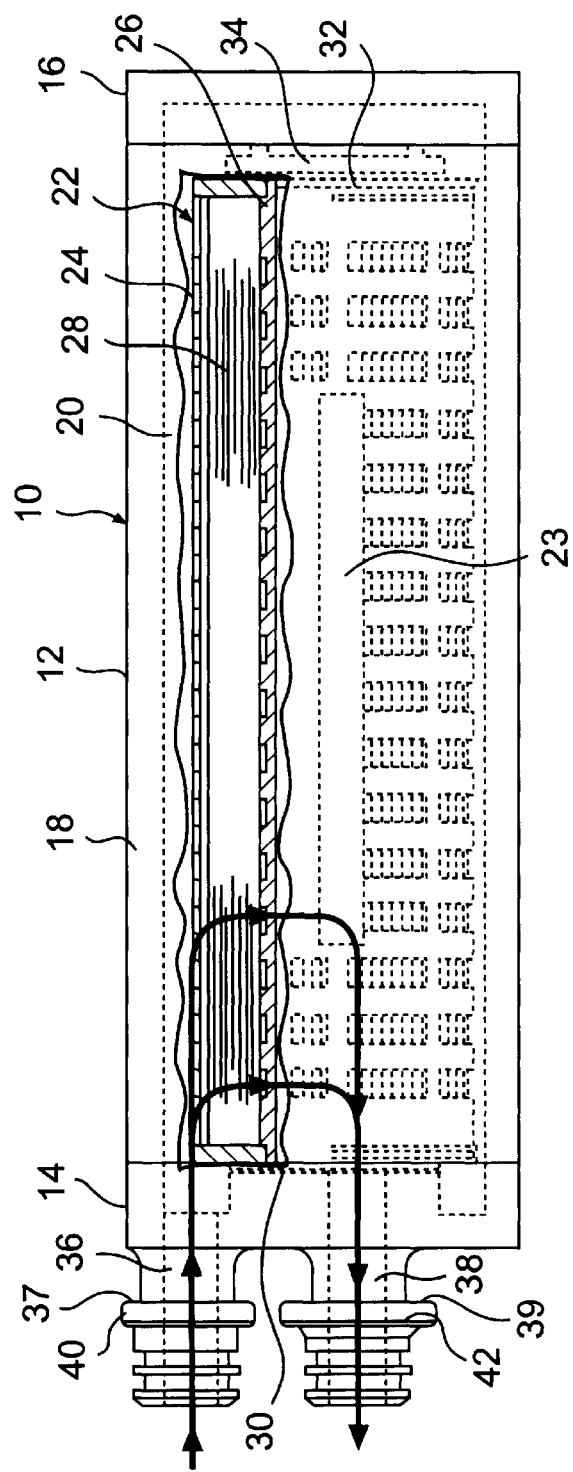
FIG. 1 is a partial cross-sectional view of one embodiment of the filter cartridge according to the teachings of the present invention.

FIG. 1 illustrates a filter 10 according to the teachings of the present invention. Filter 10 has an outer, cylindrical casing 12 with a top 14, a bottom 16, and a cylindrical tube 18 connected therebetween. The top and bottom are sealingly connected to cylindrical tube 18. The sealing connection may be either by an adhesive, by welding, by a screw-fit, or by any other suitable connecting means known to those skilled in the art. Cylindrical casing 12 defines an interior volume 20 within which a filter cartridge 22 is disposed.

Filter cartridge 22 is a cylindrical structure with an outer support member 24 and an inner support member 26 that sandwich a filter medium 28 therebetween. Inner support member 26 serves to hold filter medium 28 in place when filter 10 is operating. Outer support member 24 serves primarily as a protection of filter medium 28, especially if filter cartridge 22 is handled during replacement of filter cartridge 22. This is particularly useful when filter cartridge 22 is a replaceable module. However, as will be described in greater detail below, this is not required to practice the present invention because filter cartridge 22 need not be replaceable.

Outer support member 24 also serves to provide indicia 23 of the type of filter medium 28 contained therein. Indicia 23 may also provide other information such as the manufacturer's name, the size of particles that the filter can remove from the fluid, etc.

Filter cartridge 22 has a top end 30 and a bottom end 32. Filter cartridge 22 has an interior space (not shown) that is essentially a cylindrical volume defined by inner support member 26. The interior space of filter cartridge 22 is sealed at bottom end 32 by seal 34. Outer support member 24, inner support member 26, and seal 34 all may be made from polypropylene or, alternatively, Acrylonitrile-Butadiene-Styrene (ABS). However, as would be understood by those skilled in the art, any suitable material may be selected depending on the pressure requirements of the system and the corrosive characteristics of the medium that is passed through the filter.

Figure 2:
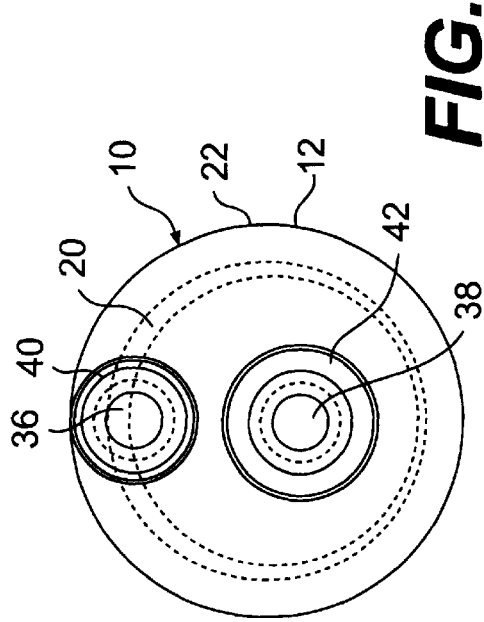
FIG. 2 is an end view illustration of the filter cartridge illustrated in FIG. 1.

As shown in FIG. 2, top end 14 of filter 10 has an inlet port 36 and an outlet port 38. Top end 30 of filter cartridge 22 sealingly engages outlet port 38. Accordingly, the fluid medium to be filtered enters filter 10 through inlet port 36, passes through filter medium 28, and exits through outlet port 38 in the manner shown by the arrows in FIG. 1. Naturally, particulate matter is trapped by filter medium 28 as the fluid passes therethrough.

In a preferred construction of the present invention, cylindrical casing 12, top 14, bottom 16, cylindrical tube 18, inlet port 36 and outlet port 38 all may be made of polypropylene or ABS. Each of these elements of filter 10 are preferably sealingly connected to one another or molded together with one another. However, as would be understood by those of ordinary skill in the art, filter 10 may be constructed from any suitable material depending on the medium that is being filtered, the pressure of the medium, and other factors. For example, in caustic or acidic environments, filter 10 may be constructed from Teflon® (tetrafluoroethylene), PTFE, or any equivalent material. Alternatively, inlet port 36 and outlet port 38 need not be made from the same material as cylindrical casing 12, top 14, bottom 16, or cylindrical tube 18. Instead, inlet port 36 and outlet port 38 may be made of a suitable metal material, such as aluminum or steel (should such a material be required) that is integrated into the construction of top 14 in a manner consistent with techniques known in the art.

Filter medium 28 may be made from any substance suitable for the type of filtration required. For example, filter medium 28 may be a hydrophilic spun material. Alternatively, filter medium 28 may be made from Teflon® where the particular environmental circumstances require it. Generally, filter medium 28 is pleated into a cylindrical shape and the free ends of the pleated material are sealed together through a heating process, through ultrasonic vibration welding, or through some other suitable technique known in the art. Regardless of the manner in which the free ends are connected to one another, all that is required is that the free ends of the filter material be sealed to prevent unfiltered fluid from passing through filter medium 28.

As shown in FIG. 2, inlet port 36 includes an inlet flange 40. Outlet port 38 includes an outlet flange 42. As shown in both FIGS. 1 and 2 the diameter of inlet flange 40 is smaller than the diameter of outlet flange 42. As will become more apparent from the discussion that follows, the different diameters of inlet flange 40 and outlet flange 42 prevent the incorrect installation of filter 10 in the valve, which is described in greater detail below. In this manner, the correct orientation of filter 10 in the valve can be assured.

FIG. 2 is an end view illustration of filter 10 depicted in FIG. 1. FIG. 2 shows the difference between the diameters of inlet flange 40 and outlet flange 42, both of which function as port identifiers. The difference between the port identifiers, in this case the flange diameters, is purposefully created to assure that filter 10 will be properly installed on the filtration system. The smaller inlet flange 40 (or inlet port identifier) is designed to engage a small receiving area on the supply side of the filtration system. Similarly, the larger outlet flange 42 (or outlet port identifier) is designed to engage a larger receiving area on the discharge side of the filtration system. As will become more apparent from the discussion that follows, the different sizes for the flanges prevents outlet port 38 from being connected to the supply side of the filtration system. Similarly, the larger outlet flange 42 prevents outlet port 38 from being inadvertently connected to the discharge side of the filtration system.

The constriction of inlet flange 40 and outlet flange 42 shown in FIGS. 1 and 2. however, are not the only flange arrangements possible. As shown in FIGS. 3–8, other arrangements for the port identifiers are possible. For example, as illustrated in FIGS. 3 and 4, it is possible that the sizes of the flanges could be reversed on filter 310 so that inlet flange 340 on inlet port 336 has a larger diameter than outlet flange 342 on outlet port 338.

In still another embodiment of the present invention, the flanges could be altered as illustrated for filter 410 shown in FIGS. 5 and 6. There, the shape of the port identifiers, specifically inlet flange 440 and outlet flange 442, differ from one another so that inlet port 436 cannot be confused with outlet port 438. It should be noted that, while inlet flange 440 is shown with a triangular shape and outlet flange 442 is shown with a square shape, those skilled in the art will readily appreciate that any of an infinite variety of shape arrangements are possible so long as inlet port 436 may be differentiated from outlet 438.

Figure 7:
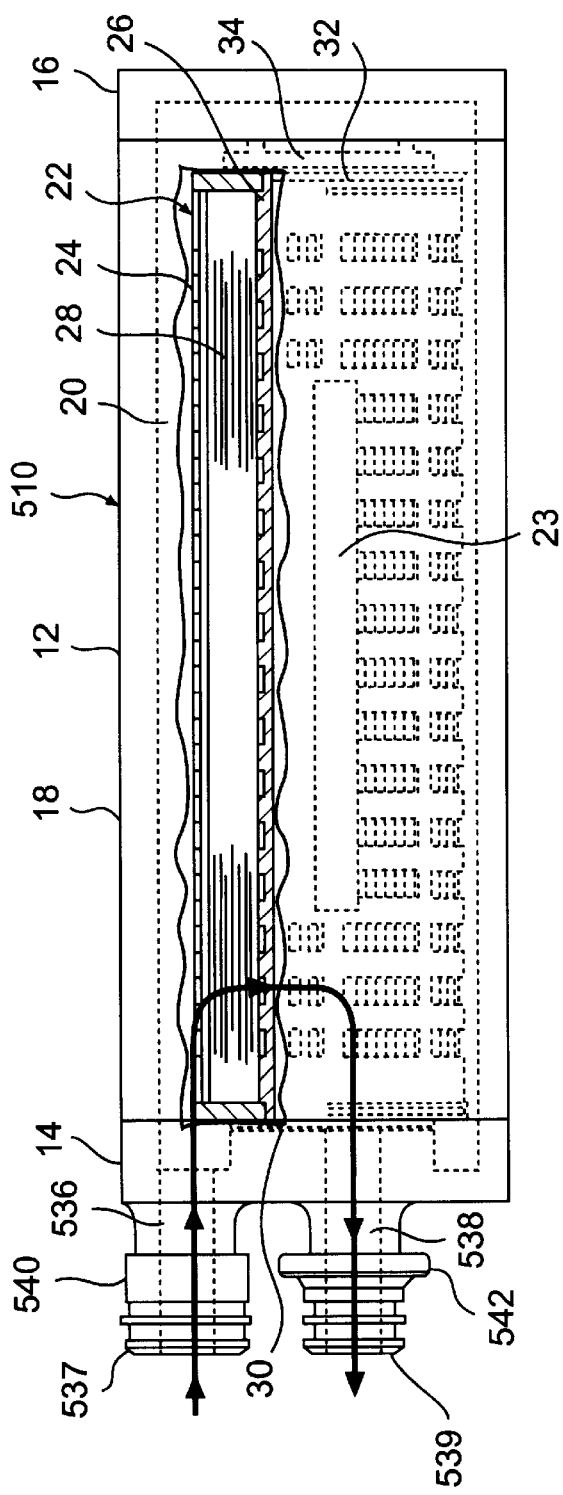
FIG. 7 is a partial cross-sectional view of a fourth embodiment of a filter cartridge according to the teachings of the present invention.
Figure 8:
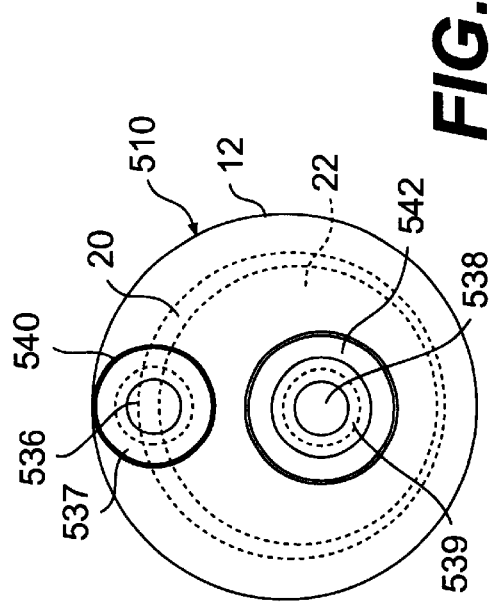
FIG. 8 is an end view illustration of the filter cartridge illustrated in FIG. 7.

As shown in still another embodiment of the present invention, the outer diameters of the inlet and outlet ports themselves could be altered instead of the flanges to achieve the same objective. Specifically, as illustrated for filter 510, the outer diameter of inlet port 536 could be modified so that it is larger than the outside diameter of nozzle end 539. This arrangement is depicted in FIGS. 7 and 8. As shown, the outside diameter of nozzle end 537 has been increased in size so that it is coextensive with flange 540. A similar modification could also be made to nozzle end 539, as would be understood by those skilled in the art. As with the other embodiments, the purpose of increasing the outside diameter of nozzle end 537 or nozzle end 539 is to create a distinction between inlet port 536 and outlet port 538 so that filter 510 cannot be improperly installed on the filtration system.

Figure 9:
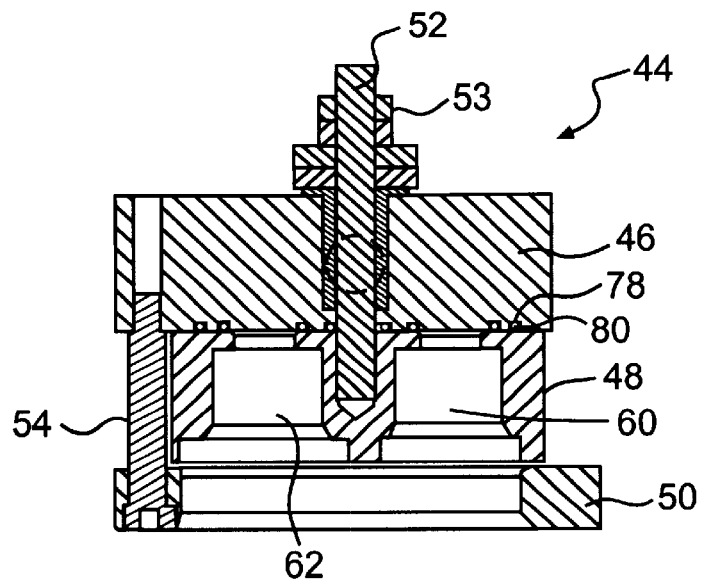
FIG. 9 is a cross-section of one embodiment of a valve according to the present invention taken along the cross-section line illustrated in FIG. 10.
Figure 10:
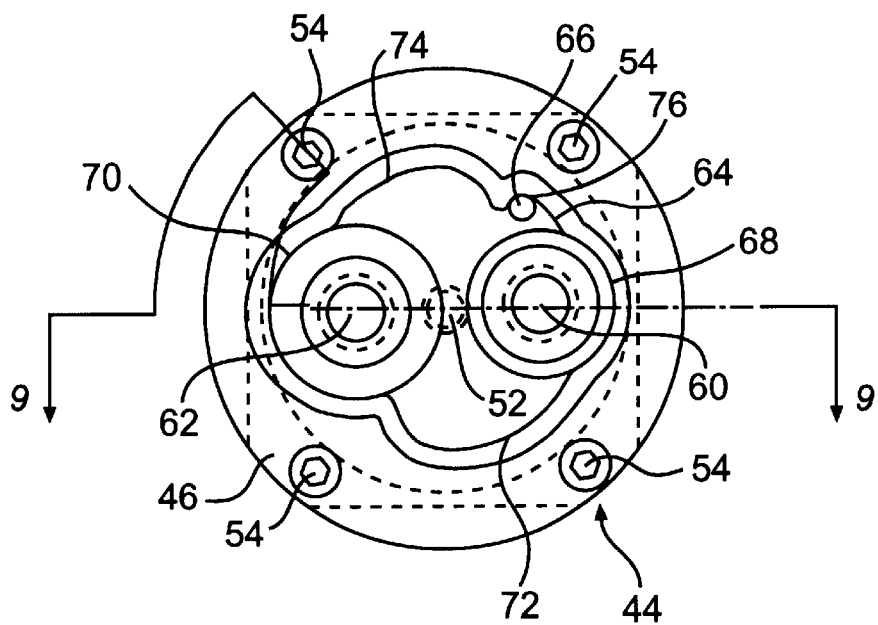
FIG. 10 is a bottom view of the valve illustrated in FIG. 9.
Figure 12:
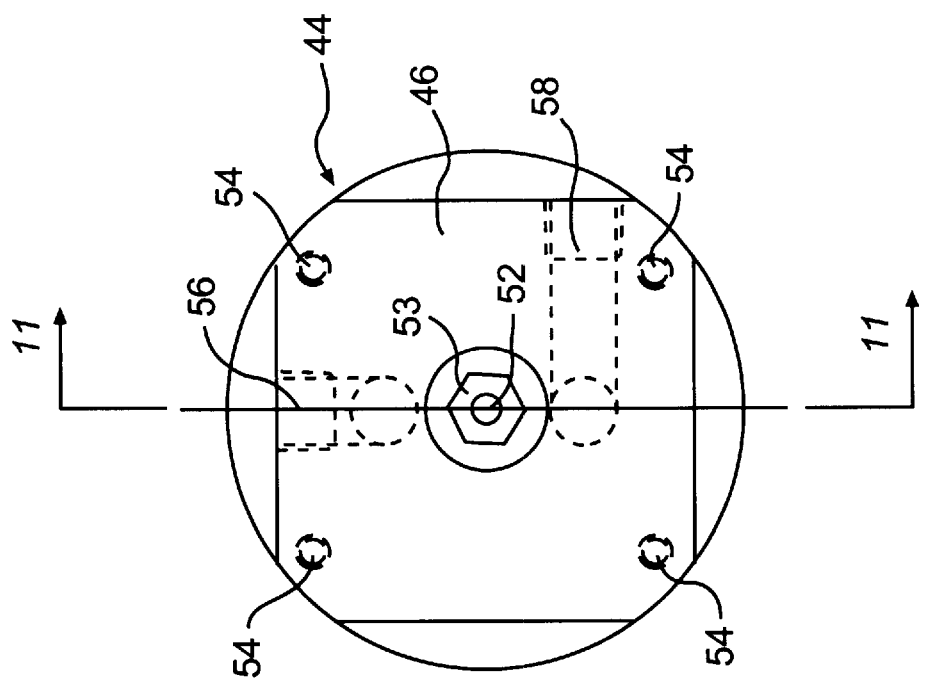
FIG. 12 is a top view of the valve shown in FIG. 9.
Figure 11:
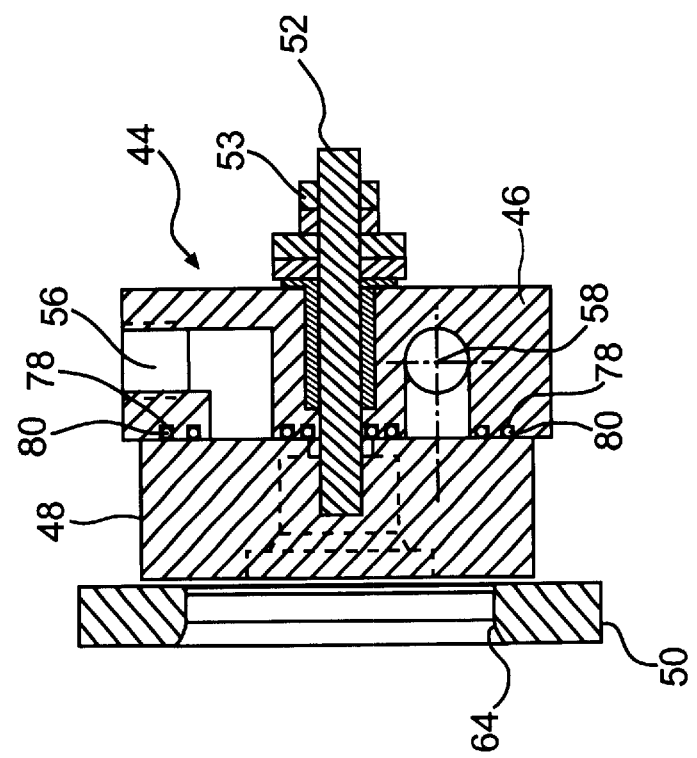
FIG. 11 is a cross-section of the valve in FIG. 9, taken along a plane perpendicular to the cross-sectional view shown in FIG. 9.

FIG. 9 illustrates a cross-sectional view of a first embodiment of a valve 44 designed to operate in connection with filter 10 illustrated in FIGS. 1 and 2. FIG. 10 illustrates a bottom view of valve 44 and shows the cross-section line (line 9—9) through which FIG. 9 is taken. FIG. 11 shows another cross-section of valve 44 taken along a line shifted 90° from the cross-section line in FIG. 9. FIG. 12 illustrates valve 44 from a top view.

Valve 44 is made with an upper plate 46, a receptacle disk 48, and a lower plate 50. Upper plate 46 is connected to receptacle disk 48 through a shaft 52 so that receptacle disk 48 can rotate in relation to upper plate 46. Shaft 52 can be a screw or other suitable connector. Shaft 52 is connected to receptacle disk 48 and passes through upper plate 46, as shown. In the embodiment illustrated, shaft 52 is held in place by a nut or lock nut 53 (or, alternatively, several bolts). Nut 53 permits the pressure between upper plate 46 and receptacle disk 48 to be adjusted so that receptacle disk 48 may rotate freely with respect to upper plate 46 (as will be explained in greater detail below). In addition, nut 53 assures that sufficient pressure will be applied between upper plate 46 and receptacle disk 48 so that fluid does not leak from between the upper plate 46 and receptacle disk 48 when valve 44 is in use. Also, the arrangement of shaft 52 and nut 53 facilitates disassembly of valve 44 so that the individual parts may be serviced or so that o-rings that have become worn may be replaced.

As would be appreciated by those skilled in the art, there are many alternatives to the arrangement of shaft 52 and nut 53 that may be used without departing from the scope and spirit of the present invention. Moreover, as will also be appreciated by those skilled in the art, connectors other than shaft 52 and nut 53 also could be substituted without departing from the scope of the present invention.

Upper plate 46, which is shown in this first embodiment as a rectangularly-shaped element of valve 44, is connected to lower plate 50 through rigid members 54 such as screws. It should be appreciated, however, that rigid members 54 need not be screws. All that is required for the embodiment described is that upper plate 46 and lower plate 50 be rigidly connected to one another so that they cannot rotate with respect to one another.

Upper plate 46 is connected to the fluid supply and discharge lines (not shown). As illustrated in FIG. 11, therefore, upper plate 46 includes a fluid inlet port 56 and a fluid outlet port 58. Fluid inlet port 56 and fluid outlet port 58 are elbow-shaped bores that extend through upper plate 46 and extend to receptacle disk 48. While elbow-shaped bores are illustrated, it should be understood that this particular arrangement is not required by the present invention. Other arrangements, such as the ones illustrated in FIGS. 30–31 and FIGS. 52–56, may be substituted while remaining within the scope of the teachings of the present invention.

Receptacle disk 48 is a cylindrically-shaped structure that includes a fluid inlet port 60 and a fluid outlet port 62 with cross-sections that allow filter inlet port 36 and filter outlet port 38 to mate easily therewith. Specifically, fluid inlet port 60 is shaped so that it readily accepts the configuration of the port identifier associated with filter inlet port 36. Similarly, fluid outlet port 62 is configured so that it readily accepts the configuration of the port identifier associated with filter outlet port 38. In other words, the configuration of fluid inlet port 60 and fluid outlet port 62 is such that filter 10 will be correctly installed in every instance, because only one orientation of filter 10 to valve 44 is possible.

Lower plate 50 acts to restrain filter 10 when inserted into valve 44. Lower plate 50 is a circularly-shaped plate with a cammed opening 64 cut therethrough, as shown in FIG. 10. A pin 66 extends from receptacle disk 48 into the cammed opening 64 in lower plate 50. Pin 66 acts as a security stop for valve 44 to prevent over-rotation of receptacle disk 48.

The operation of valve 44 will now be explained with respect to FIGS. 1–2 and 9–12. When inlet port 36 and outlet port 38 of filter 10 are inserted into fluid inlet port 60 and fluid outlet port 62 in receptacle disk 48, receptacle disk 48 is positioned so that it does not communicate with fluid inlet 56 or fluid outlet port 58. In other words, when filter 10 is inserted into valve 44, valve 44 is in an "off" position. The "off" position is illustrated in FIGS. 9 and 11. Once filter 10 has been positioned in valve 44, filter 10 and receptacle plate 48 are rotated 90 degrees. After rotation, fluid inlet port 56 aligned with filter inlet port 36 and fluid outlet port 58 is aligned with filter outlet port 38 so that fluid may flow through filter 10. Valve 44, therefore, acts as a gate valve to turn on or off the flow to filter 10, which facilitates the removal and replacement of filter 10 and permits a rapid exchange of the filter without spillage of the medium to be filtered.

As will be explained in greater detail, lower plate 50 facilitates the filter exchange operation. Cammed opening 64 has an inlet portion 68 and an outlet portion 70 that are large enough to permit inlet flange 40 and outlet flange 42 to pass therethrough. However, when receptacle disk 48 is turned 90 degrees, cammed opening 64 provides an inlet retention surface 72 and an outlet retention surface 74 that are not spaced as far from the center of lower plate 50 as inlet portion 68 and outlet portion 70. In other words, inlet retention surface 72 and outlet retention surface 74 extend inwardly toward the center of lower plate 50 As a result, when filter 10 is rotated with receptacle disk 48, retention surface 72 prevents outlet flange 42 from disengaging receptacle disk 48 because it holds outlet port 38 in receptacle disk 48 by providing a barrier that contacts with a lower surface 37 of inlet port 36 (see FIG. 1). Similarly, retention surface 74 prevents inlet port 36 from disengaging from receptacle disk 48 because it acts as a barrier to the movement of inlet flange 40 out of fluid inlet port 60. Specifically, upon rotation of receptacle disk 48 so that the valve is in the "on" position, retention surface 74 engages a lower surface 39 of outlet flange 38 (see FIG. 1).

Pin 66 abuts pin stop 76 on cammed opening 64 when receptacle disk 48 has been rotate so that valve 44 is closed and filter 10 can be removed from valve 44. Pin 66 acts as a safety feature to prevent the inadvertent over-rotation of receptacle disk 48 when there is no filter 10 in valve 44 to assure that fluid inlet port 56 will align with filter inlet port 36 and that fluid outlet port 58 will align with filter outlet port 38. This prevents filter inlet port 36 and filter outlet port 38 from becoming reversed.

Upper plate 46 and receptacle disk 48 may be made from any suitable material. For example, aluminum may be used for both structures and is preferred for its low weight and strength. Stainless steel may also be used where the particular application requires it. However, stainless steel is considerably heavier than aluminum and more expensive. Alternatively, it is possible that the various components of valve 44 could be constructed from a plastic material such as polypropylene or ABS, as would be under stood by those skilled in the art. Regardless of the materials used for the construction of upper plate 46 and receptacle disk 48, lower plate 50, while it may also be fashioned from aluminum or steel, is preferably made from polypropylene or ABS (or other suitable polymeric or plastic material).

To create a fluid-tight seal between upper plate 46 and receptacle disk 48, upper plate 46 is provided with a number of grooves 78 in which o-rings 80 may be positioned, as shown in FIGS. 9 and 11. A more detailed illustration of the arrangement of o-rings 80 is shown throughout the various figures of the drawings, as will be explained in greater detail below. While the first embodiment of receptacle disk 48 has been described in connection with the first embodiment of filter 10 of the present invention, those of ordinary skill in the art will readily recognize that receptacle disk 48 may be modified to accommodate the other embodiments of filter 10 that are illustrated in FIGS. 3–8. In each case, the receptacle disk for the valve may be altered so that the particular valve embodiment may accept the inlet ports and outlet port identifiers associated with the respective inlets and outlets for the filter.

Figure 13:
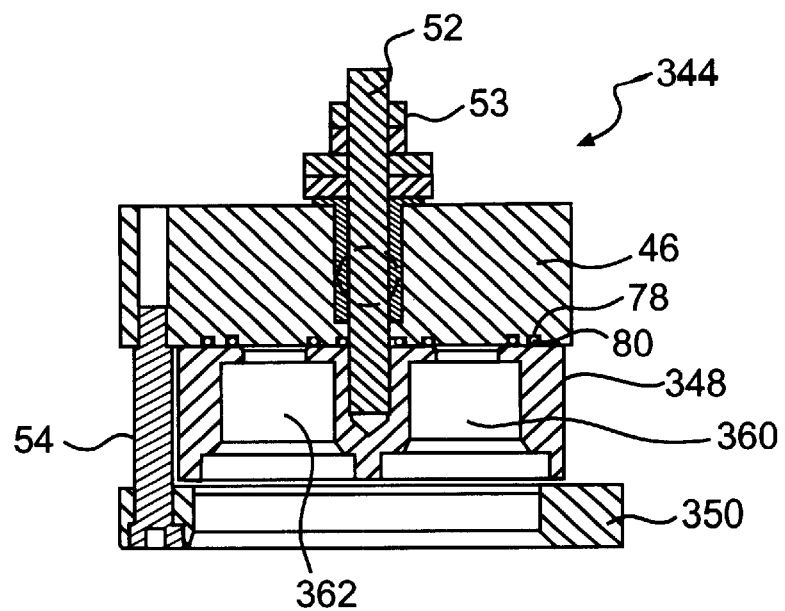
FIG. 13 is a cross-sectional view of a second embodiment of the valve illustrated in FIGS. 9–10.
Figure 14:
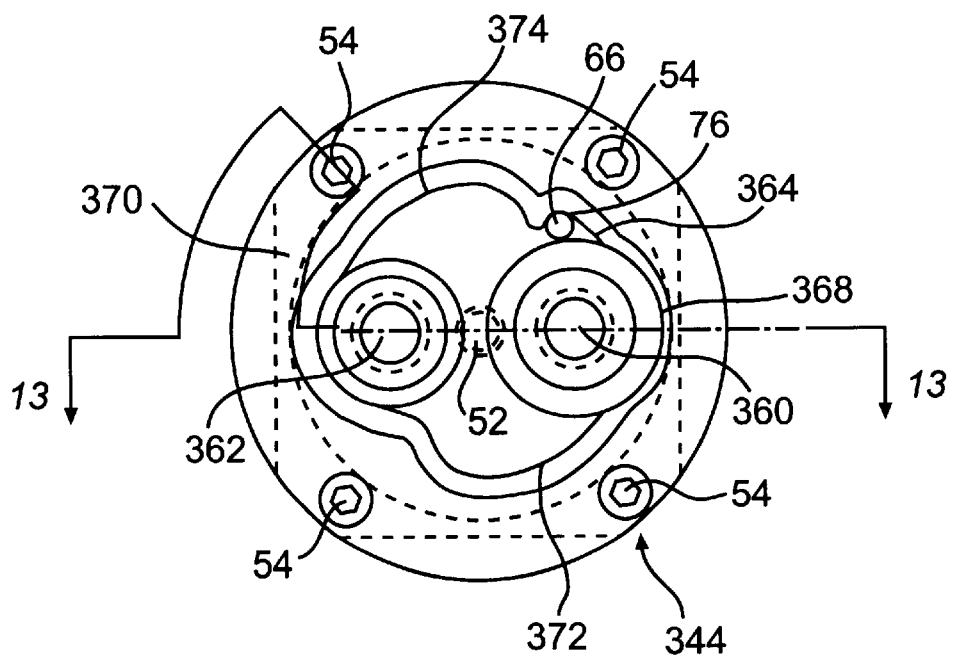
FIG. 14 is a bottom view of the valve shown in FIG. 13.

For example, FIGS. 13–14 illustrate valve 344 that is designed to accommodate filter 310 illustrated in FIGS. 3–4. There, outlet flange 342 has a smaller diameter than inlet flange 340. As a result, filter inlet port 360 and filter outlet port 362 on receptacle disk 348 must be adapted to accommodate them. Accordingly, in this embodiment, inlet port 360 has a larger diameter to accommodate the larger diameter of inlet flange 340. Similarly, outlet port 362 has a smaller diameter than inlet port 360 to accommodate the smaller diameter of outlet flange 342. In addition, inlet retention surface 372 and outlet retention surface 370 are altered in valve 344 to accommodate this change in the design.

Figure 15:
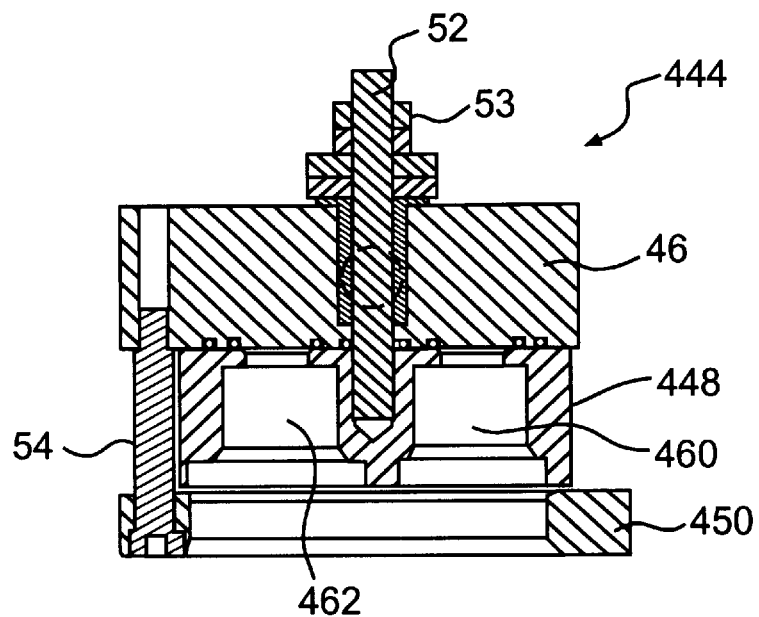
FIG. 15 is a cross-sectional view of a third embodiment of the valve illustrated in FIGS. 9–10.
Figure 16:
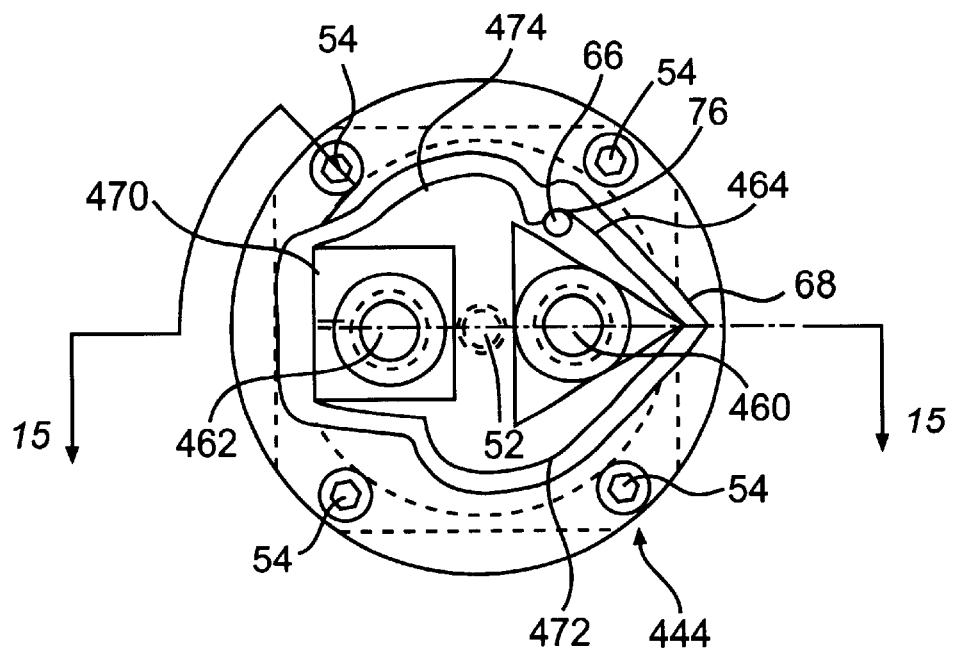
FIG. 16 is a bottom view of the valve illustrated in FIG. 15.

FIGS. 15–16 illustrate valve 444, which is constructed according to the third embodiment of the present invention. Here, valve 444 is designed to receive filter 410, which is illustrated in FIGS. 5–6. As described above, inlet flange 440 has a triangular shape while outlet flange 442 has a rectangular shape. To receive these port identifiers, receptacle disk 448 includes filter inlet port 460 and filter outlet port 462 that are shaped t o accommodate inlet flange 440 and outlet flange 442. In addition, lower plate 450 includes a cammed of opening 464 with an inlet portion 68 and an outlet portion 470 that is also shaped to accommodate inlet flange 440 and outlet flange 442. The inlet portion defines an inlet retention surface 472 and the outlet portion defines an outlet retention surface 474 that operate as described above to keep filter 410 in fluid communication with filter inlet port 460 and filter outlet port 464.

Figure 17:
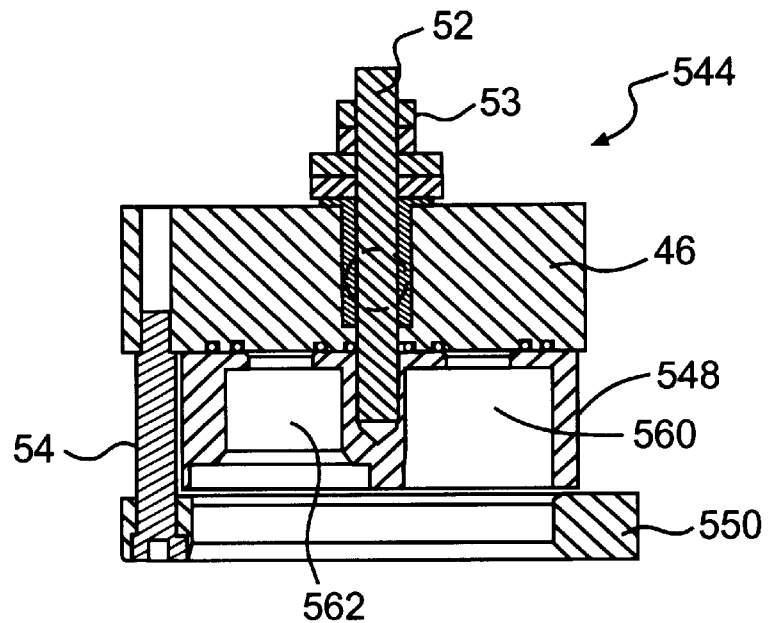
FIG. 17 is a cross-sectional view of a fourth embodiment of the valve illustrated in FIGS. 9–10.
Figure 18:
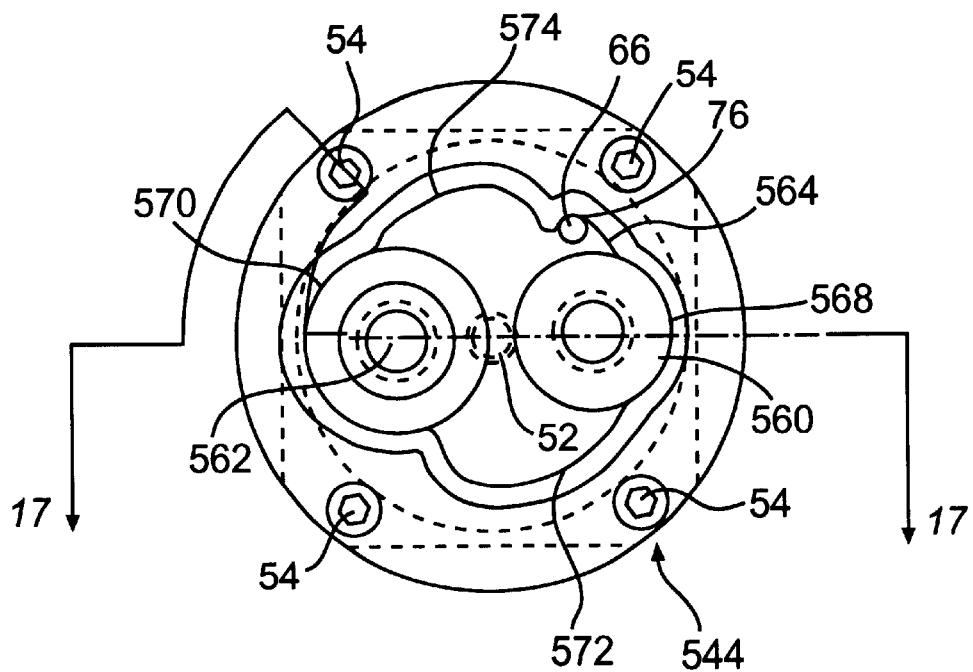
FIG. 18 is a bottom view of the valve illustrated in FIG. 17.

FIGS. 17–18 show valve 544. Valve 544 is designed to accommodate filter 510 that is illustrated in FIGS. 7 and 8. To do so, receptacle disk 548 contains a filter inlet port 560 that can accommodate the shape of the port identifier associated with filter inlet 536. Filter outlet port 562 is shaped to accommodate the port identifier associated with filter outlet 538. The operation of filter 510 is the same as with the previously described embodiments.

In addition to these embodiments and consistent with the teachings herein, it should be appreciated that any particular arrangement of the port identifiers may be selected from the embodiments described above. Moreover, as those skilled in the art would readily recognize, there are many other constructions possible for the port identifiers that also fall within the scope of the present invention.

Figure 20:
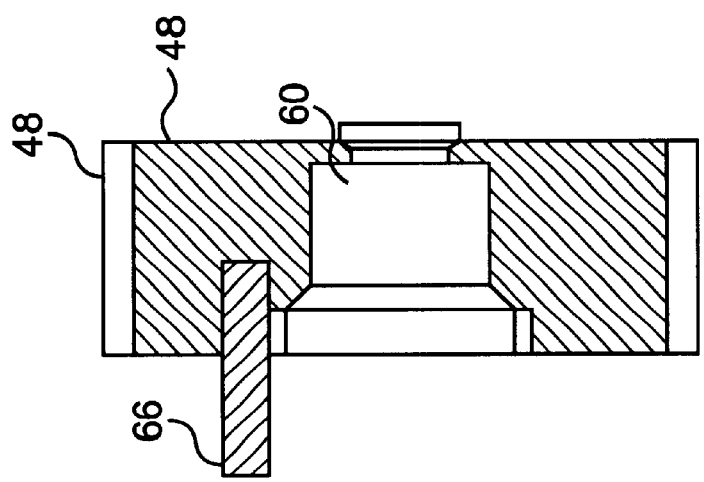
FIG. 20 is a cross-sectional view of the receptacle disk illustrated in FIG. 19.
Figure 19:
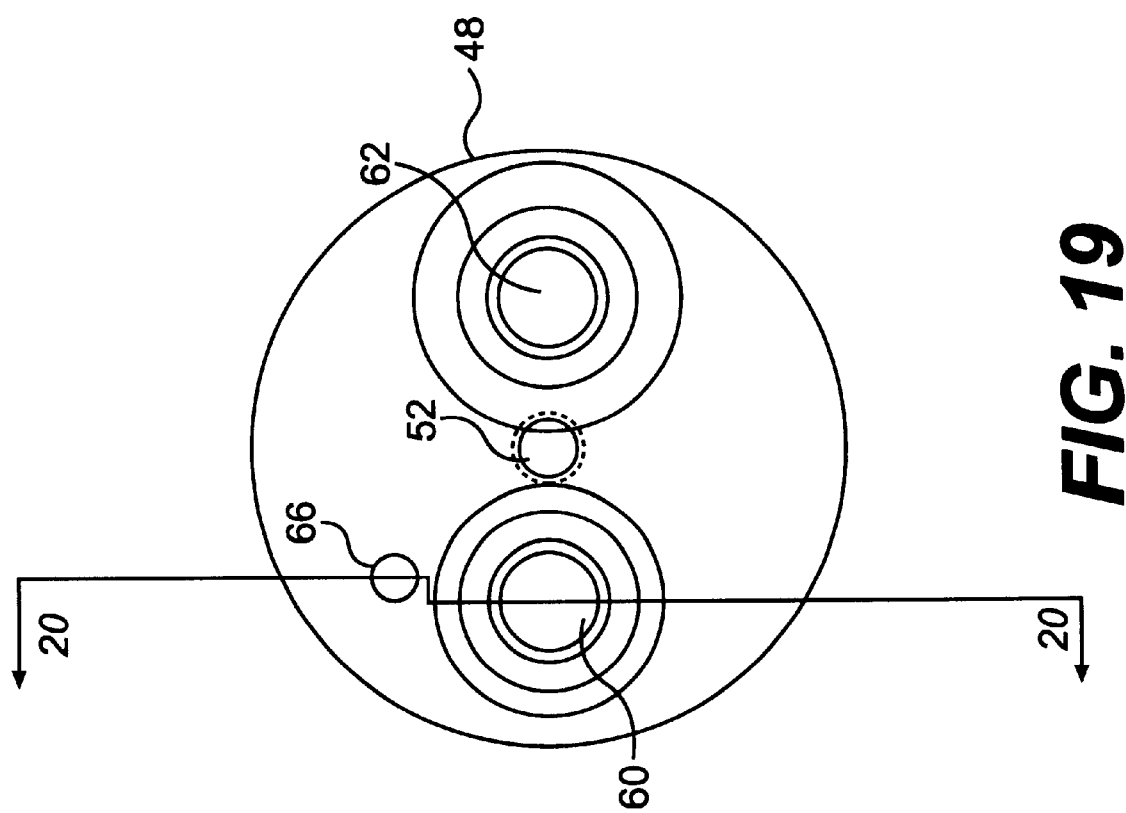
FIG. 19 is bottom view of the receptacle disk of the valve illustrated in FIGS. 9–10.

FIG. 19 illustrates a bottom view of receptacle disk 48, showing in greater detail fluid inlet port 60 and fluid outlet port 62. Pin 66 is also illustrated in this figure, as is the location of shaft 52. FIG. 20, which is a cross-section of receptacle disk 48 taken along the cross-section line 20—20 in FIG. 19, illustrates receptacle disk 48 in greater detail as well.

Figure 21:
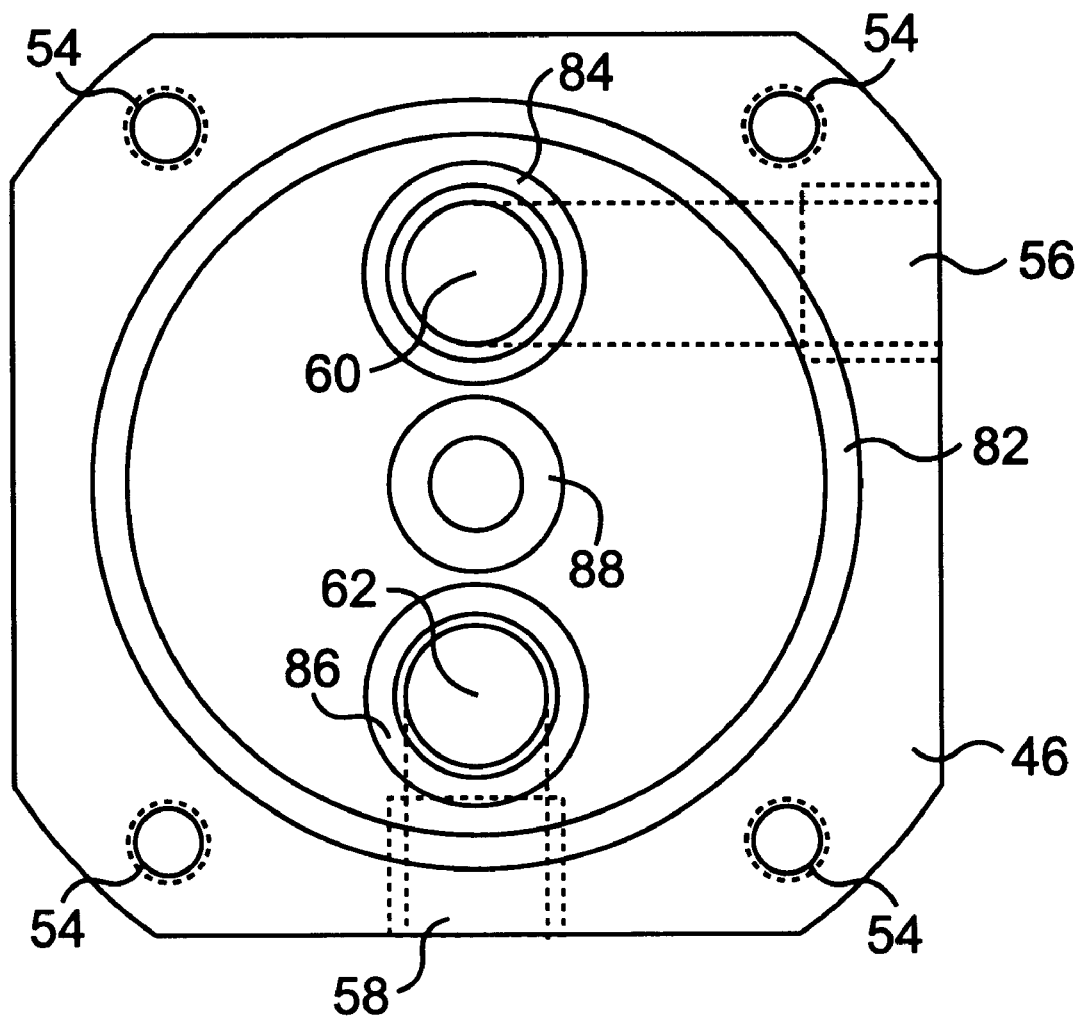
FIG. 21 is a bottom view of one embodiment of the upper plate for the valve illustrated in FIGS. 9–10.

FIG. 21 illustrates upper plate 46 from a bottom view. As shown, upper plate 46 includes a large o-ring groove 82 that surrounds the hole for the shaft 52. It should be noted, however, that large o-ring groove 82 need not be concentric with the hole for shaft 52, even though this is the arrangement shown in FIG. 21. It should be noted that the particular o-ring arrangement is not necessary to practice the present invention. As will be made more clear from the description that follows, many o-ring arrangements are possible as would be understood by those skilled in the art.

As illustrated in FIG. 21, large o-ring groove 82 encircles fluid inlet port 60 and fluid outlet port 62. An inlet port o-ring groove 84 surrounds fluid inlet port 60. An outlet port o-ring groove 86 surrounds fluid outlet port 62. A shaft o-ring groove 88 surrounds the hole in receptacle plate 46 for shaft 52. When valve 44 is assembled, each of the grooves holds an o-ring 80 to seal fluid inlet port 60 and fluid outlet port 62 from one another and from the environment. O-rings 80 prevent discharge of the fluid being filtered during the filtration operation and also during rotation of receptacle plate 46 when valve 44 is opened and closed.

Figure 22:
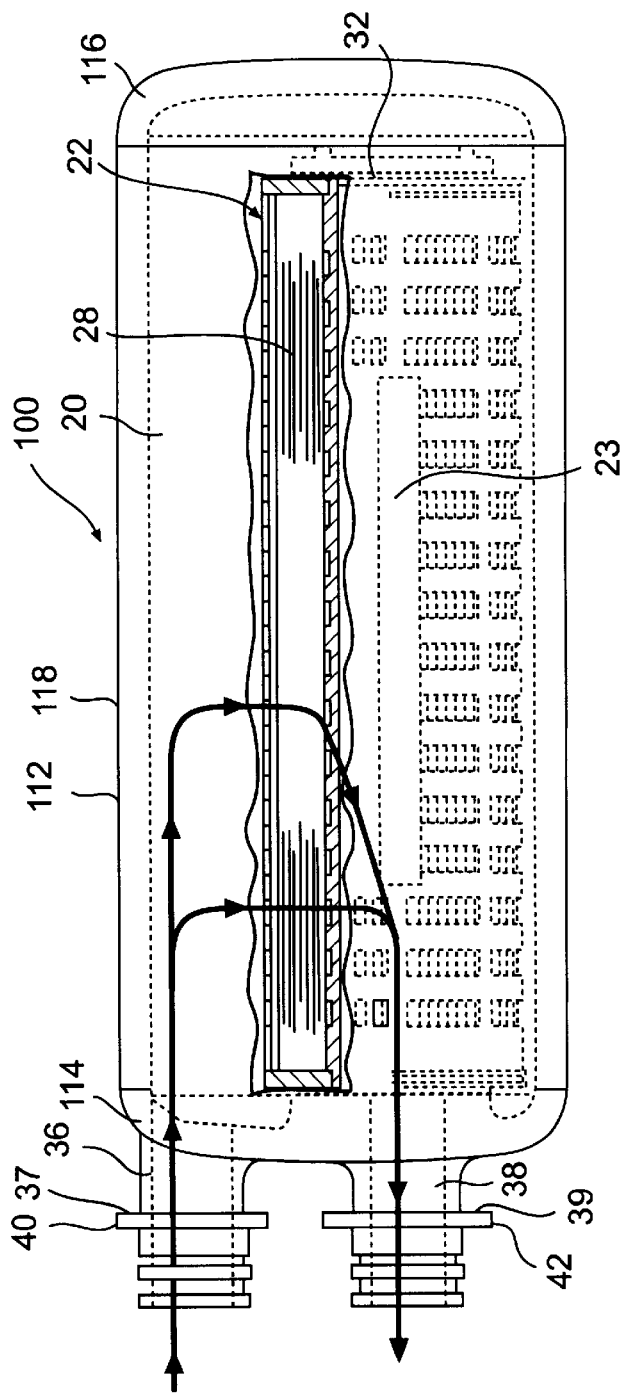
FIG. 22 is a partial cross-sectional side view of another embodiment of the filter canister of the present invention.
Figure 23:
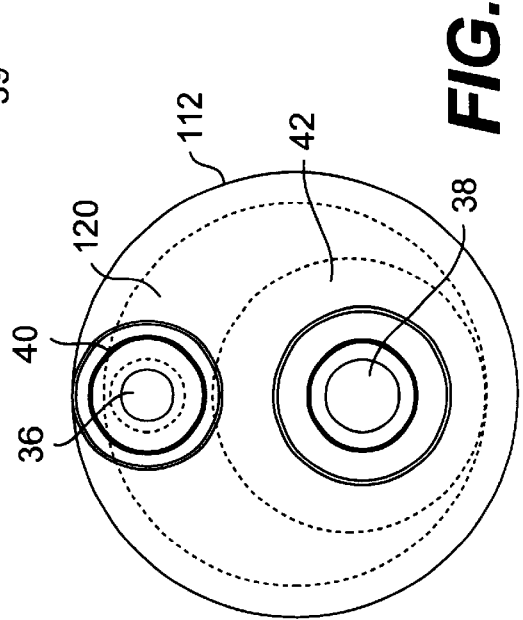
FIG. 23 is an end view of the filter canister shown in FIG. 22.

FIG. 22 illustrates another embodiment of the filter according to the present invention. In FIG. 22, filter 100 is shown with a less angular appearance, both externally and internally. Also, filter 100 is shown with a slightly larger overall size than filter 10. As shown, top 114 and bottom 116 have a curved appearance, both externally and internally. As with filter 10, filter 100 includes an inlet port 36 and an outlet port 38. Fluid flows into the inlet port 36, through filter cartridge 22, and exits through outlet port 38. An interior volume 120 is defined between cylindrical tube 118 of cylindrical housing 112 and filter cartridge 22. In most other respects, filter 100 is like filter 10. The operation of filter 100 does not differ significantly from filter 10. Moreover, while flanges 40, 42 are illustrated, any combination of port identifiers may be applied to filter 100 in the same manner as described in relation to filter 10.

As shown in FIGS. 33 and 34, which illustrate still another embodiment of the filter of the present invention, filter 200 is preferably a unitary, sealed construction so that filter 200 may be conveniently disposed. While it is preferred that filter 200 be disposable, filter 200 may be constructed so that cartridge 222 may be removed from the interior thereof and removed.

While similar in many respects to the other embodiments disclosed, filter 200 is provided with a two-part construction, a top portion 214 and a bottom portion 216. Both portions are preferably constructed from ABS (Acrylonitrile-Butadiene-Styrene) (although any suitable plastic or polymeric material may be used). Top portion 214 may threadedly engage 216, it may be mechanically welded to bottom portion 216 (e.g., by an adhesive), or it may be chemically welded to bottom portion 216, depending on whether or not top and bottom portions 214 and 216 are to be reused after filter cartridge 222 is changed. To form a sealable engagement, top portion 214 extends over a portion of bottom portion 216.

Top portion 214 is provided with an inlet port 236 and an outlet port 238. Fluid flows into filter 200 through inlet 236, passes through filter cartridge 222 and exits from filter 200 through outlet 238. An interior volume 220 is defined between cylindrical tube 218 of cylindrical housing 212 and filter cartridge 222. The operation of filter 200 is the same as for filter 10 and filter 100. Flanges 240 and 242 operate in the same manner as flanges 40, 42 in the other embodiment described.

Filter 200 differs from filters 10 and 100 in that it further includes spindles 211 and 213, the construction of which are illustrated in greater detail (typically) in FIGS. 35–39. While spindle 211 is illustrated in FIGS. 35–39, it should be noted that the same construction applies equally to spindle 213. Spindle 211 includes a forward necked-down region 215 connected to a wider, base portion 217. A recess 219 is provided between necked-down region 215 and base portion 217 to accommodate an o-ring 221 (see FIGS. 33 and 38). As shown in FIG. 33, spindle 211 is sealingly attached to top portion 214 on its interior through a connection between base portion 217 of spindle 211 and a cylindrical wall portion 231 that may be integrally molded to the interior surface of top portion 214. Necked-down region 215 is inserted into the interior of cartridge 222 and o-ring 221 forms a sealing engagement with the interior of cartridge 222 so that fluid cannot enter the interior of cartridge 222 without passing through cartridge 222 in the intended manner. The same is true for spindle 213, except that spindle 213 sealingly engages the base of bottom portion 216 by fitting onto an indented portion 233 that projects into the bottom of filter 200.

ABS is the preferred material from which filter 200 is constructed because top portion 214 and bottom portion 216 may be easily and sealingly connected to one another with a sealant/adhesive that is known to those skilled in the ABS art. It should be noted, however, that filter 200 could be constructed from polypropylene or any other suitable material. As shown, top portion 214 slides onto a insert portion 237 of bottom portion 216 until bottom portion abuts stops 235 that may be integrally formed with the interior surface of top portion 214.

FIGS. 40–44 illustrate the construction of top portion 214 in greater detail.

Figure 46:
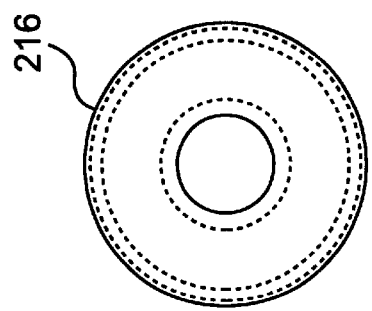
FIG. 46 is a bottom view of the bottom portion illustrated in FIG. 45.
Figure 45:
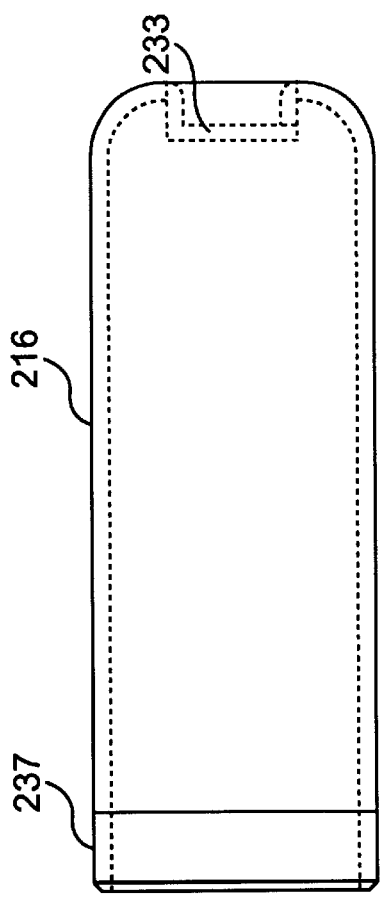
FIG. 45 is a side-view of the bottom portion of the filter shown in FIG. 33.
Figure 47:
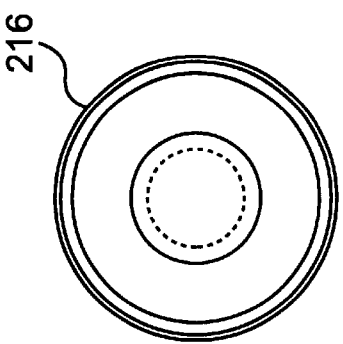
FIG. 47 is a top view of the bottom portion illustrated in FIG. 45.

FIGS. 45–47 illustrate the construction of bottom portion 216 in greater detail.

FIGS. 24–31 illustrate alternate embodiments of valve 44 discussed in detail above. To avoid repetition, primarily only the differences from the components illustrated in valve 44 are discussed in detail below.

Figure 24:
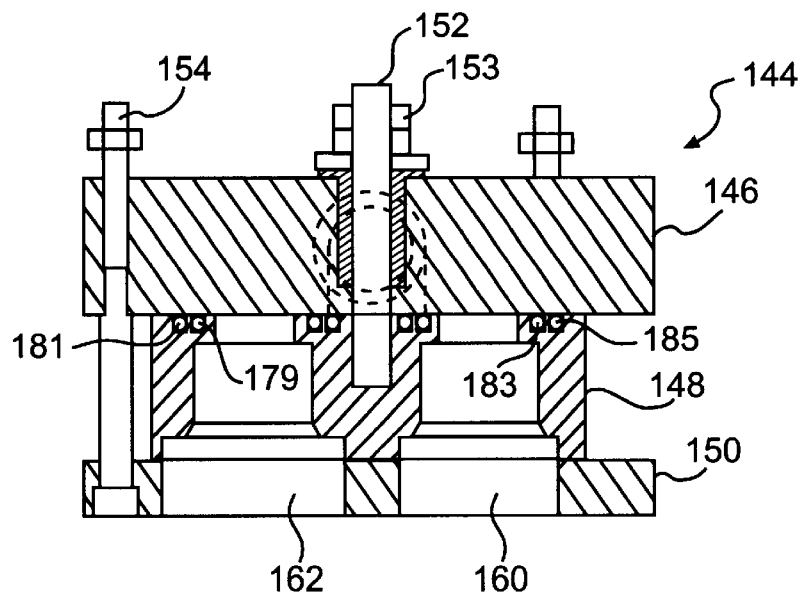
FIG. 24 is a cross-sectional view of another embodiment of a valve contemplated for use with the filter canister of the present invention.

As shown in FIG. 24, valve 144 includes an upper plate 146, a receptacle disk 148, and a lower plate 150. However, in valve 144, there are differences in each of these structures that distinguish them from upper plate 46, receptacle disk 48 and lower plate 50 in valve 44.

Figure 25:
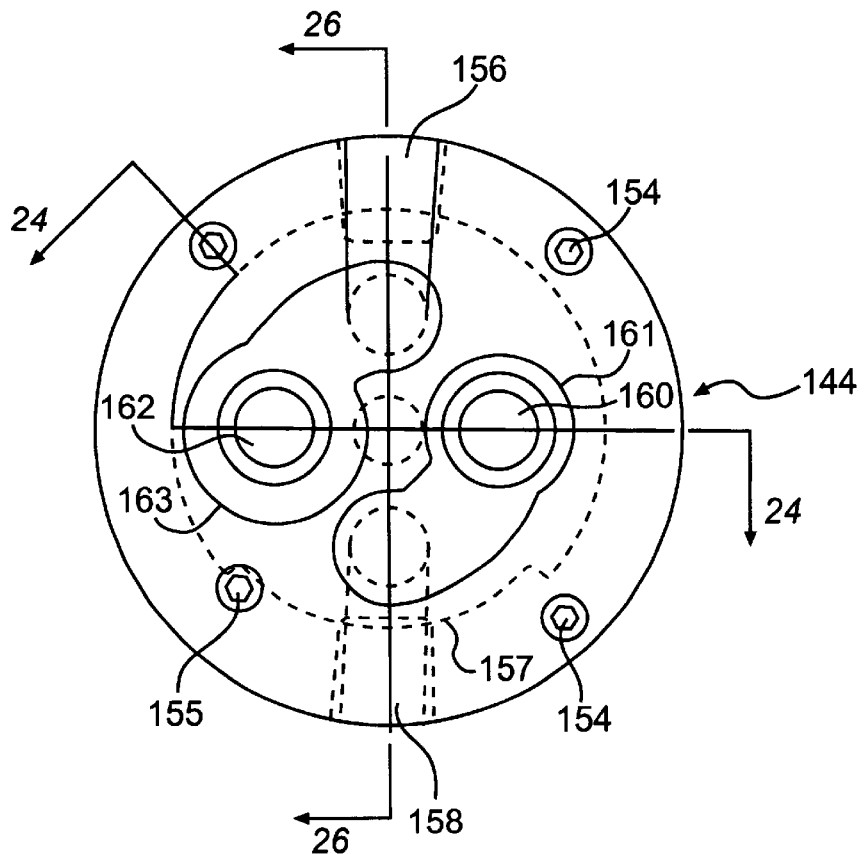
FIG. 25 is a bottom view of the valve illustrated in FIG. 24.
Figure 27:
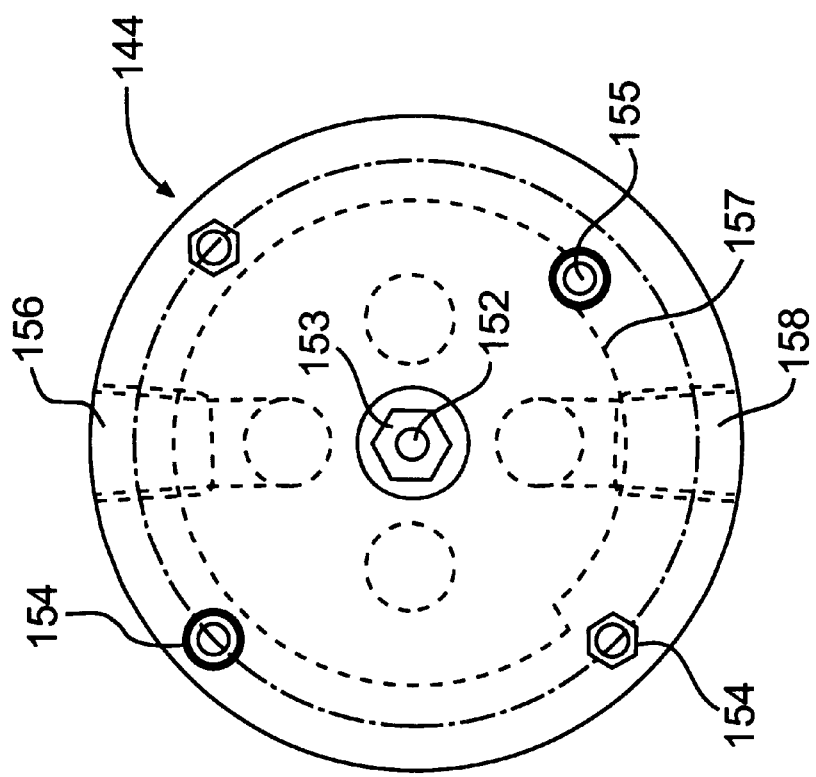
FIG. 27 is a top view of the valve illustrated in FIG. 24.
Figure 26:
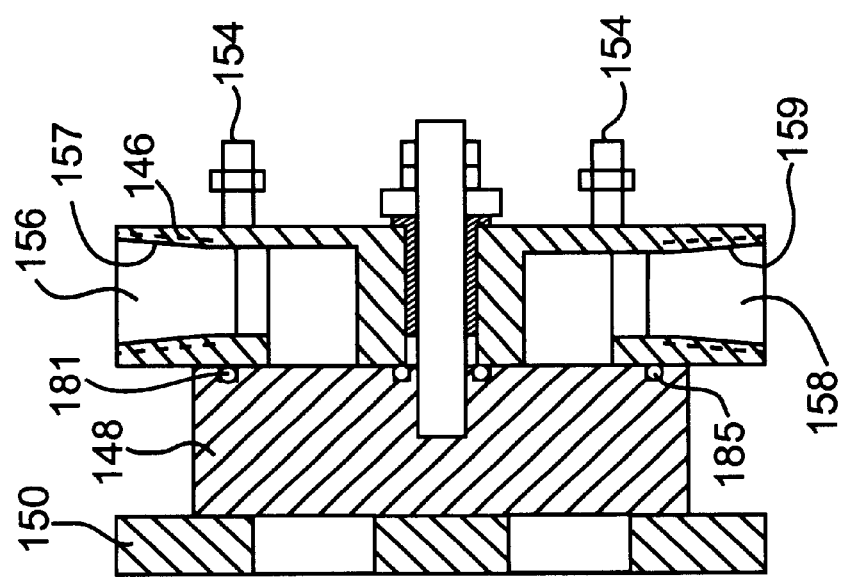
FIG. 26 is a cross-sectional view of the valve illustrated in FIG. 24, the cross-section taken along a plane perpendicular to that in FIG. 24.

For example, as illustrated in FIG. 25, which is a bottom view of valve 144, and as illustrated in FIG. 27, which is a top view of valve 144, upper plate 144 is cylindrically-shaped rather than being rectangularly-shaped. In addition, inlet port 156 and outlet port 158 extend radially within upper plate 146. As illustrated in FIG. 26, inlet port 156 may have tapered inner sides 157 and outlet port 158 may have tapered inner sides 159. Alternately, inner sides 157, 159 may not be tapered at all or may have a greater degree of taper than shown, depending on the design requirements.

Screws 154 are placed in different locations in valve 144 than they are in valve 44. Specifically, one of screws 154, screw 155, is offset from the periphery of upper plate 146 so that it intersects with a portion 157 of receptacle plate 148 that has been removed. The interaction of screw 155 and portion 157 provides a limit barrier beyond which receptacle plate 148 cannot be turned. This prevents receptacle plate 148 from being turned so that the fluid lines 156 and 158 and the fluid inlet port 160 and fluid outlet port 162 do not become improperly aligned. In other words, screw 155 provides the same function as pin 66 in valve 44.

Instead of providing a single opening in lower plate 150 (as was done in lower plate 50), cammed surface 164 in lower plate 150 is divided into two separate cammed surfaces, inlet cammed surface 161 and outlet cammed surface 163. While lower plate 150 differs from lower plate 50 because it does not include a single cammed opening 64, cammed surfaces 161, 163 act in the same manner as cammed opening 64. Specifically, cammed surfaces 161, 163 are shaped to engage lower surfaces 37, 39 of inlet port 36 and outlet port 38 so that filter 100 is retained by valve 144 during operation.

As illustrated in FIGS. 24, 26, 28, 29, and 30, the placement of the o-ring grooves also differs in valve 144 from valve 44, but all are consistent with a two (or more) piece seal construction. However, in keeping with the teachings of the present invention, any of the o-ring configurations described herein can be used on any of the valve embodiments that fall within the scope of the present invention. This includes the one piece molded seal described in greater detail below.

Figure 28:
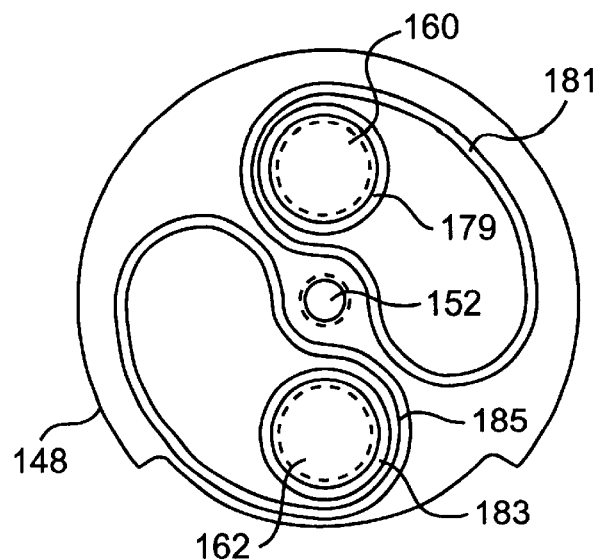
FIG. 28 is a top view of the receptacle disk contemplated for use in the valve illustrated in FIG. 24.

As illustrated in FIG. 28, an o-ring groove 179 encircles fluid inlet port 160 for placement of an o-ring therein. A second, kidney-shaped o-ring groove 181 is placed around o-ring groove 179. Kidney-shaped bring groove 181 extends to a location 90 degrees from fluid inlet port 160, which is the location of the inlet port in upper plate 146 when upper plate 146 and receptacle disk 148 are not aligned so that fluid flows to the filter cartridge. Fluid output port 162 also has a circular o-ring groove 183 therearound. A kidney-shaped o-ring groove 185 extends around the circular o-ring groove 183 and encompasses. The location on receptacle disk 148 where fluid outlet 158 will be located when valve 144 is in the "off" position. When kidney-shaped o-ring grooves 181, 185 contain o-rings, therefore, they act as a seal to prevent the leakage of fluid from the fluid supply and discharge lines when valve 144 is in the "off" position.

Figure 29:
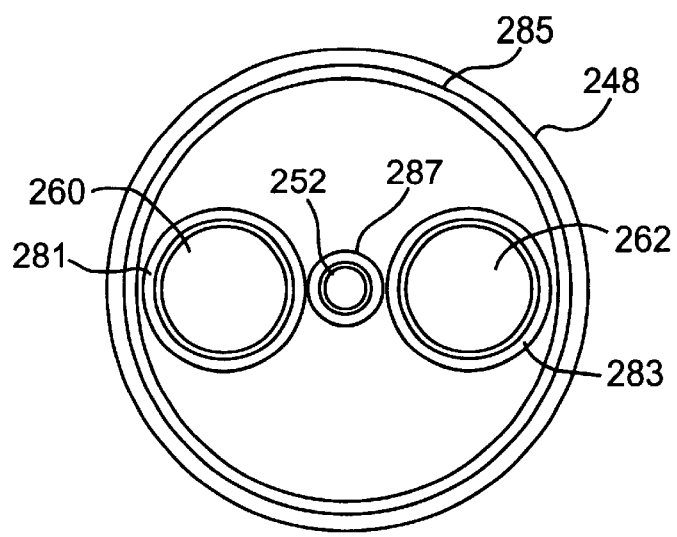
FIG. 29 is a top view of an alternative receptacle disk contemplated for use in the valve illustrated in FIG. 24.
Figure 30:
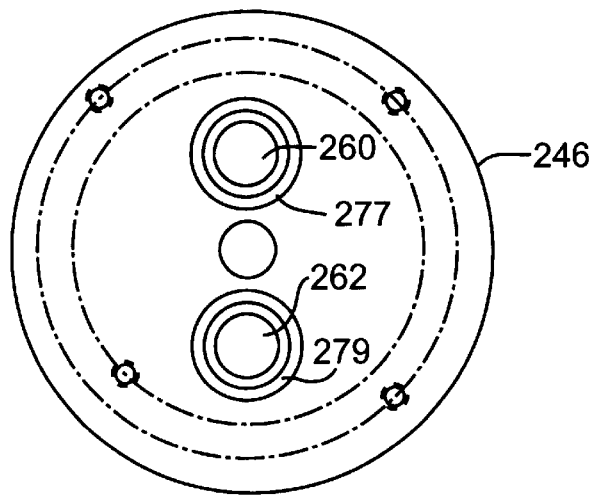
FIG. 30 is a bottom view of one embodiment of the upper plate contemplate for use in the valve illustrated in FIG. 24.

FIG. 29 illustrates an alternate embodiment of receptacle disk 248, which does not include removed portion 157. As a result, receptacle disk 248 might include a pin (like pin 66 (not shown)) to prevent the over-rotation of receptacle disk 248 during replacement of the filter. Alternately, receptacle disk 248 could be manufactured to include a removed portion 157 as illustrated in FIGS. 25–27.

As illustrated in FIG. 29, receptacle disk 248 contains an o-ring groove configuration that differs from the configuration illustrated in FIG. 28. As illustrated, a first o-ring groove 281 encircles the opening to fluid inlet port 260 and a second o-ring groove 283 encircles the opening of fluid outlet port 262. A third o-ring groove 285 encircles both o-ring groove 281 and o-ring groove 283 by encircling the periphery of receptacle disk 248. A fourth o-ring groove 287 may be included in receptacle disk 248. When each of these grooves contain o-rings, they prevent the leakage of fluid from the valve when it is operating. When an o-ring is placed into fourth o-ring groove 287, fluid is prevented from flowing into the hole for shaft 252.

Regardless of the o-ring placement in the receptacle disk, o-rings also may be provided on the bottom surface of upper plate 246. As illustrated, a first o-ring groove 277 may be positioned to encircle fluid inlet port 260 while a second o-ring groove 279 may be positioned to encircle fluid outlet port 262. O-rings placed into these grooves assist in sealing the engagement between upper plate 246 and receptacle disk 248 so that fluid does not leak from between the two valve parts.

Figure 31:
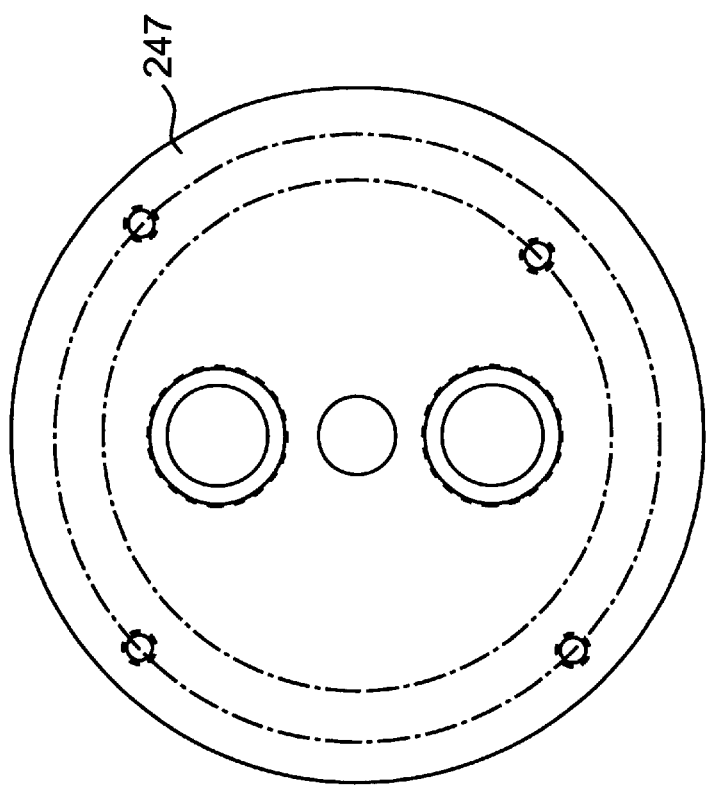
FIG. 31 is a top view of the upper plate illustrated in FIG. 30.
Figure 32:
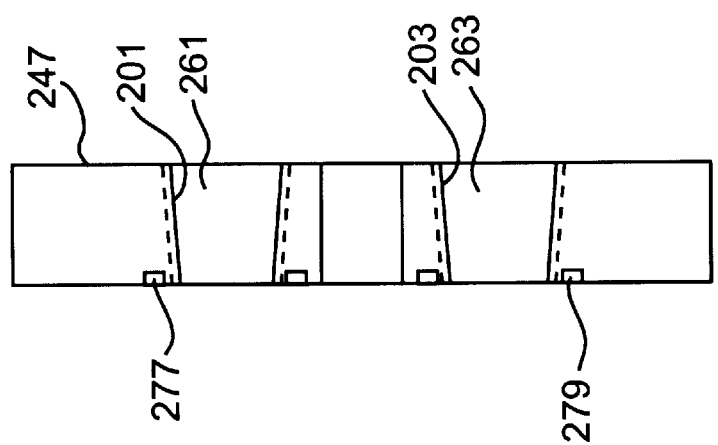
FIG. 32 is side view of the upper plate illustrated in FIG. 31.
Figure 36:
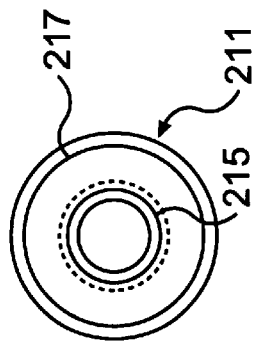
FIG. 36 is a bottom view illustration of the spindle shown in FIG. 35.
Figure 35:
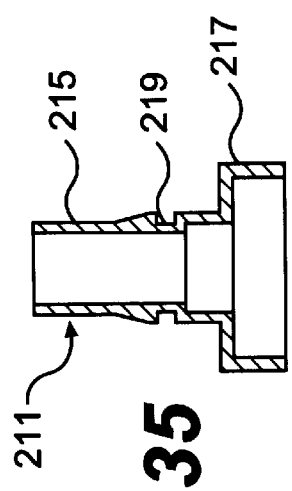
FIG. 35 is a cross-sectional illustration of one of the spindles for the filter illustrated in FIG. 33.
Figure 39:
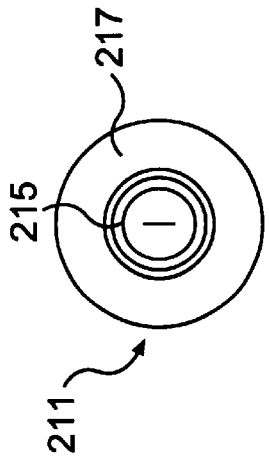
FIG. 39 is a top view of the spindle illustrated in FIG. 35.
Figure 38:
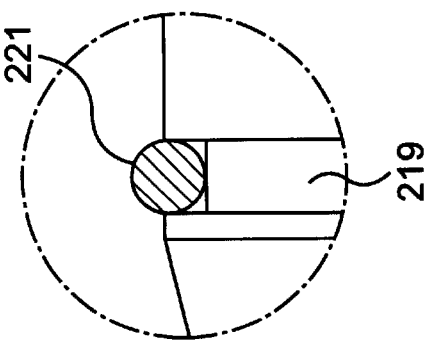
FIG. 38 is an enlarged side view of the recess in the spindle shown in FIG. 35.
Figure 37:
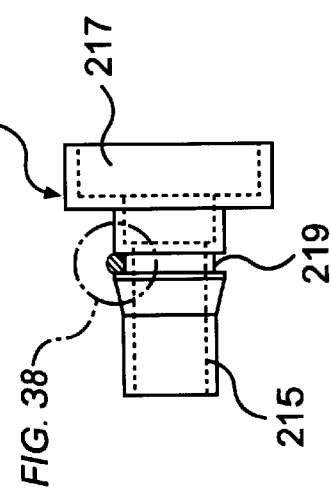
FIG. 37 is a side-view illustration of the spindle shown in FIG. 35.
Figure 44:
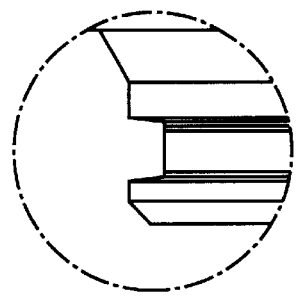
FIG. 44 is an enlarged side view of the inlet of the top portion shown in FIG. 40.
Figure 41:
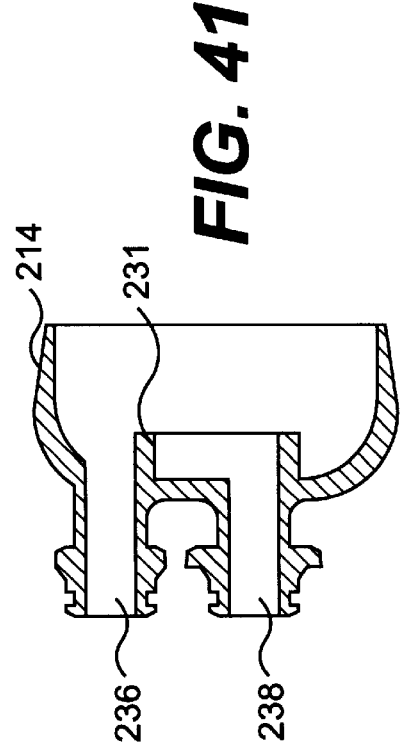
FIG. 41 is a cross-sectional view of the top portion illustrated in FIG. 40.
Figure 43:
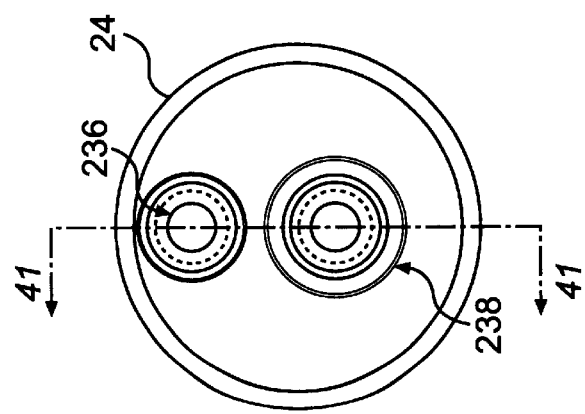
FIG. 43 is a top view of the top portion illustrated in FIG. 40.
Figure 40:
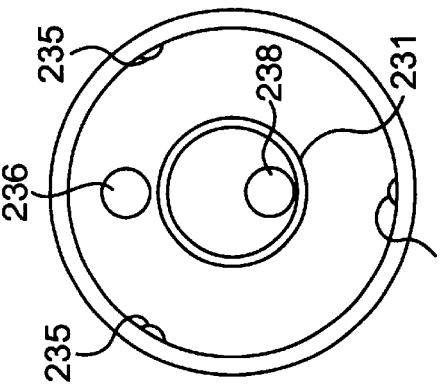
FIG. 40 is a side-view illustration of the top portion of the filter illustrated in FIG. 33.
Figure 42:
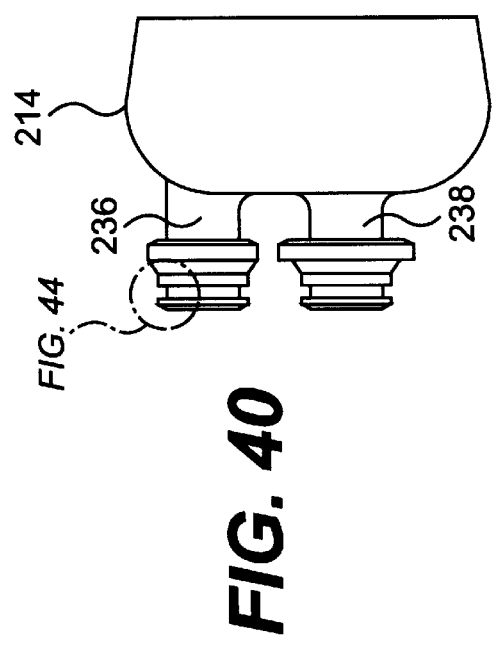
FIG. 42 is a bottom view of the top portion shown in FIG. 40.

FIGS. 31 and 32 illustrate another embodiment of upper plate 247 that is contemplated by the present invention. In this embodiment, fluid inlet port 261 and fluid outlet port 263 extend through upper plate 246 without changing direction. Moreover, inner sides 201, 203 of fluid inlet port 261 and fluid outlet port 263 are tapered.

While not shown, filter 200 also may include a pressure relief valve on top portion 214 or bottom portion 216 (or even on the valve itself or the fluid lines connected thereto) to release pressure in filter 200 before filter 200 is removed from its associated valve. Because filter 200 is made from an expansible material (such as ABS), it tends to expand when connected to the liquid to be filtered. As a result, when the pressure of the fluid is sufficiently great, if filter 200 is removed from the valve without first releasing the pressure therein, a stream of fluid may eject from inlet port 236 and outlet port 238. To avoid the sudden release of fluid in a sterile environment (such as in a clean room or in a surgical operating room), the relief valve is operated before filter 200 is removed from the valve. The pressure relief valve may also assist in situations where a negative pressure (or a suction force) inhibits removal of filter 200 from its associated valve.

Figure 49:
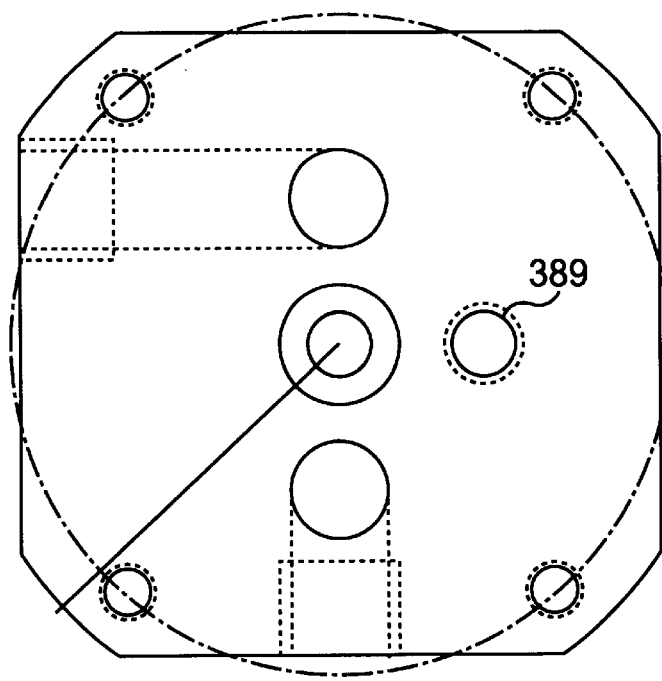
FIG. 49 illustrates a top view of the valve upper plate shown in FIG. 48.
Figure 50:
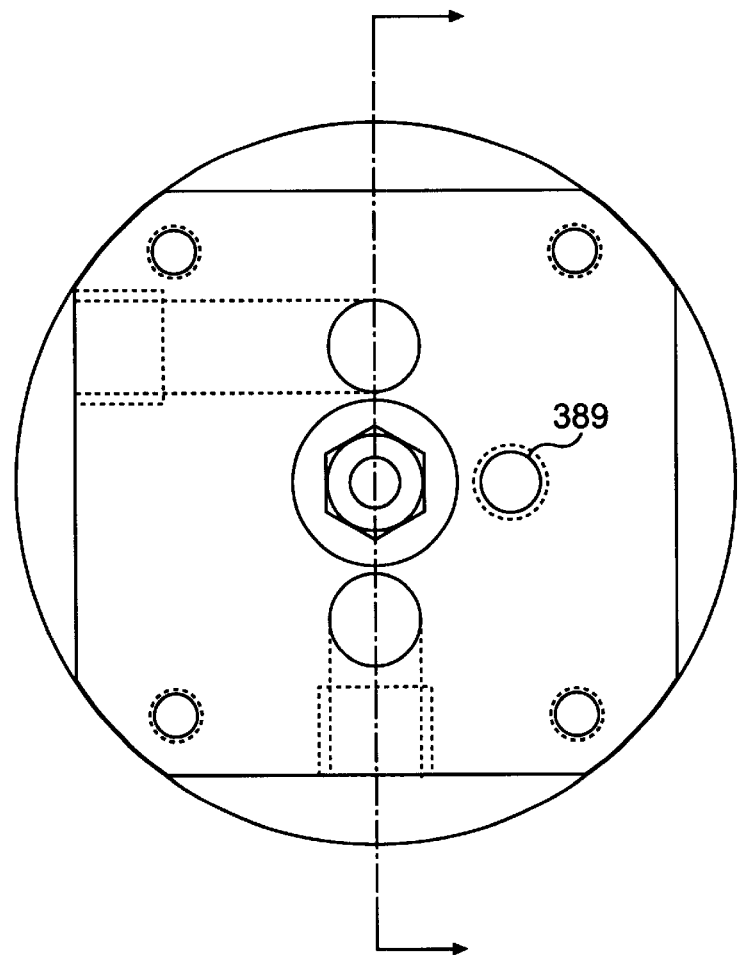
FIG. 50 shows a top view of another embodiment of the valve according to the present invention, illustrating the position of a relief valve.

FIGS. 49–50 illustrate the placement of one embodiment of a relief valve 389 in upper plate 347. Relief valve 389 is a hole drilled into upper plate 347 to release the pressure in the system when the valve has been turned to the off position and the filter is to be removed therefrom. While the relief valve 389 is shown as a hole, those skilled in the art will readily recognize that there are many suitable alternatives.

Figure 48:
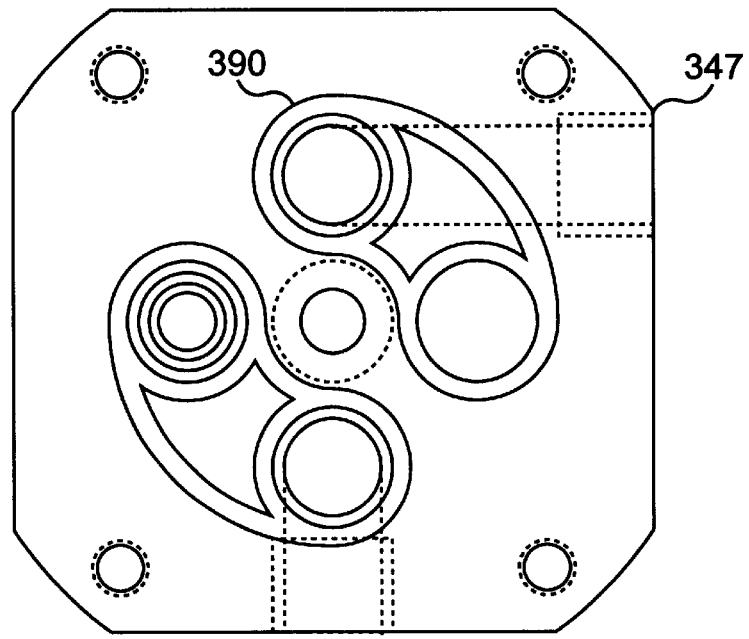
FIG. 48 is a bottom view of another embodiment of the valve upper plate shown in FIG. 21.
Figure 51:
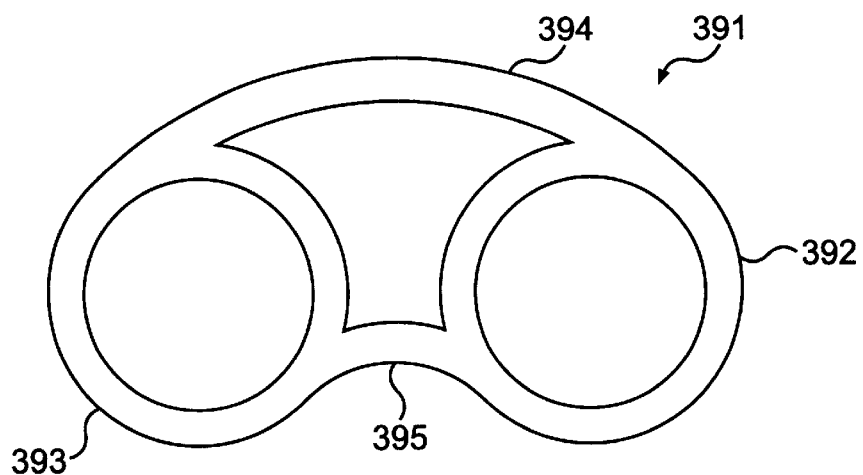
FIG. 51 is a top view of the sealing member used with the upper plate shown in FIG. 48.
Figure 52:
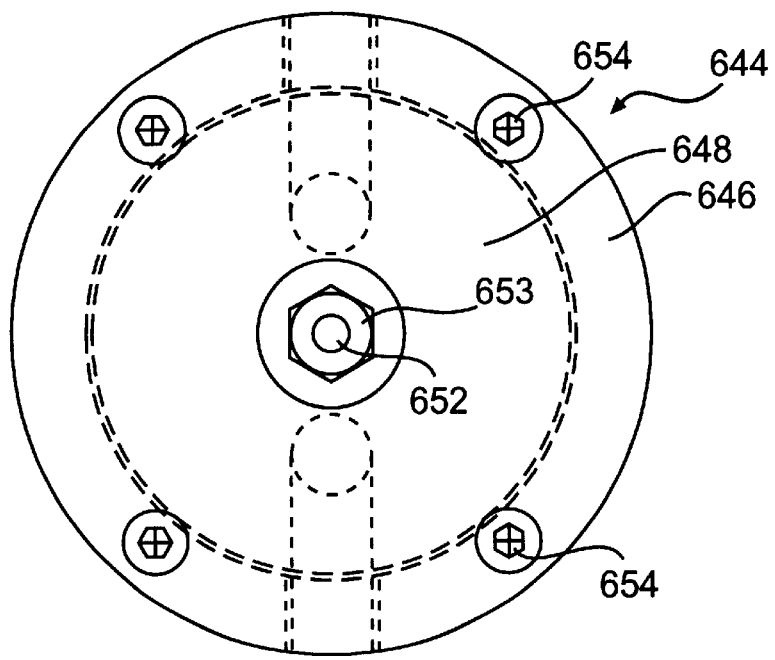
FIG. 52 is a top view of another embodiment of the valve of the present invention.
Figure 53:
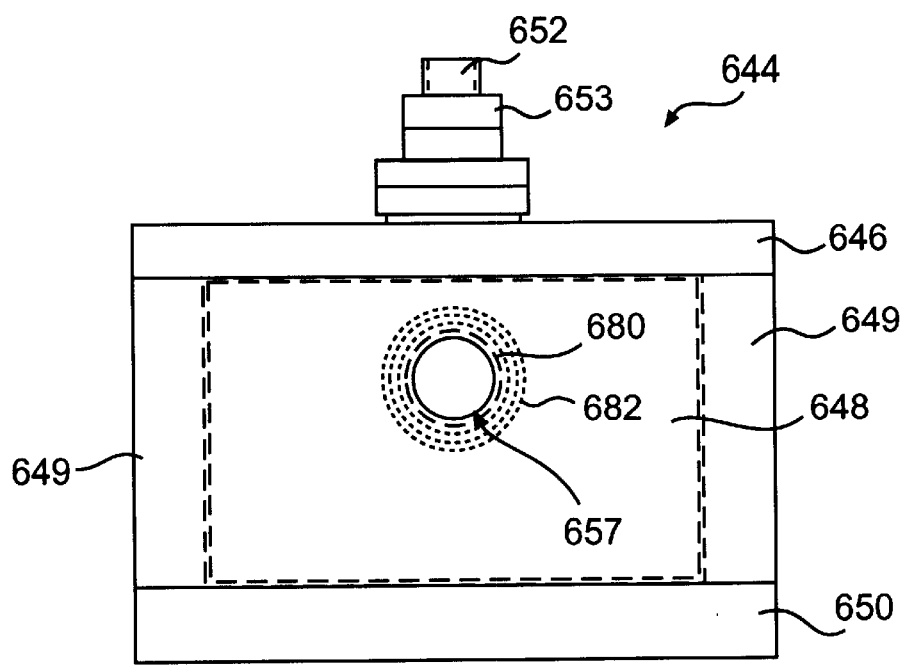
FIG. 53 is a side view of the valve illustrated in FIG. 52.
Figure 54:
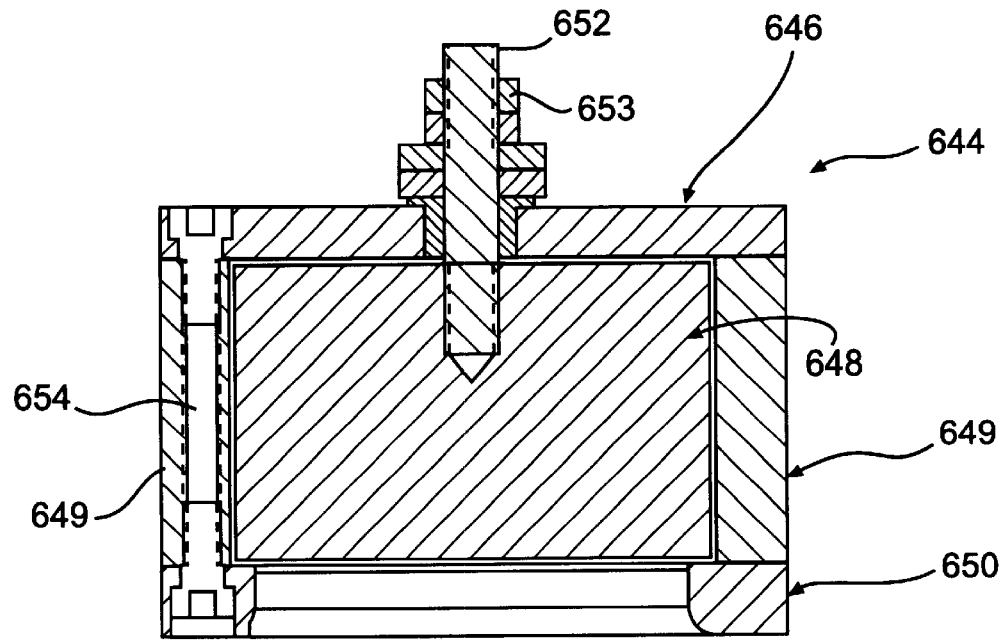
FIG. 54 is a cross-sectional side view illustration of the valve depicted in FIG. 52.

FIG. 48 illustrates an alternate embodiment of the upper plate shown in FIG. 21. In FIG. 48, however, upper plate 347 includes a recess 390 that accommodates a unitary, kidney-shaped sealing member 391, which is shown in greater detail in FIG. 51. Sealing member 391 includes a first circular section 392 and a second circular section 393 that are joined to one another by a first connecting portion 394 and a second connecting portion 395. Sealing member 391 acts to seal upper plate 347 against the lower plate to prevent the leakage of fluid when the valve is turned from the opened to the closed positions. Sealing member 391 acts in the same manner as o-rings 179, 181, 183, and 185, which are illustrated in the embodiment shown in FIG. 28.

FIGS. 52–56 illustrate one further embodiment of the valve according to the teachings of the present invention. Valve 644 includes an upper plate 646, a receptacle disk 648, and a lower disk 650. As with other embodiments of the valve, upper plate 646 is connected rotatably to receptacle disk 648 by a shaft 652 so that receptacle disk 648 can rotate in relation to upper plate 646. Shaft 652 can be a screw or other suitable connector. Shaft 652 is connected to receptacle disk 648 and extends through upper plate 646 as shown. As illustrated, shaft 652 is held in place be a nut or lock nut 653 (or, alternatively, several nuts or bolts, as shown). Nut 653 permits the pressure between upper plate 646 and receptacle disk 648 to be adjusted so that receptacle disk 648 may freely rotate with respect to upper plate 646.

In addition, nut 653 assures an appropriate relationship between upper plate 646 and receptacle disk 648 so that the fluid ports on the filter align appropriately with the inlet and discharge lines from the fluid system to which valve 644 is attached.

Upper plate 646, in the embodiment shown, is a circular plate that is rigidly connected to lower plate 650 by several rigid members 654, such as screws. It should be appreciated, however, that rigid members 654 need not be screws. All that is required for this embodiment is that upper plate 646 and lower plate 650 be rigidly connected to one another so that they cannot rotate with respect to one another.

Figure 55:
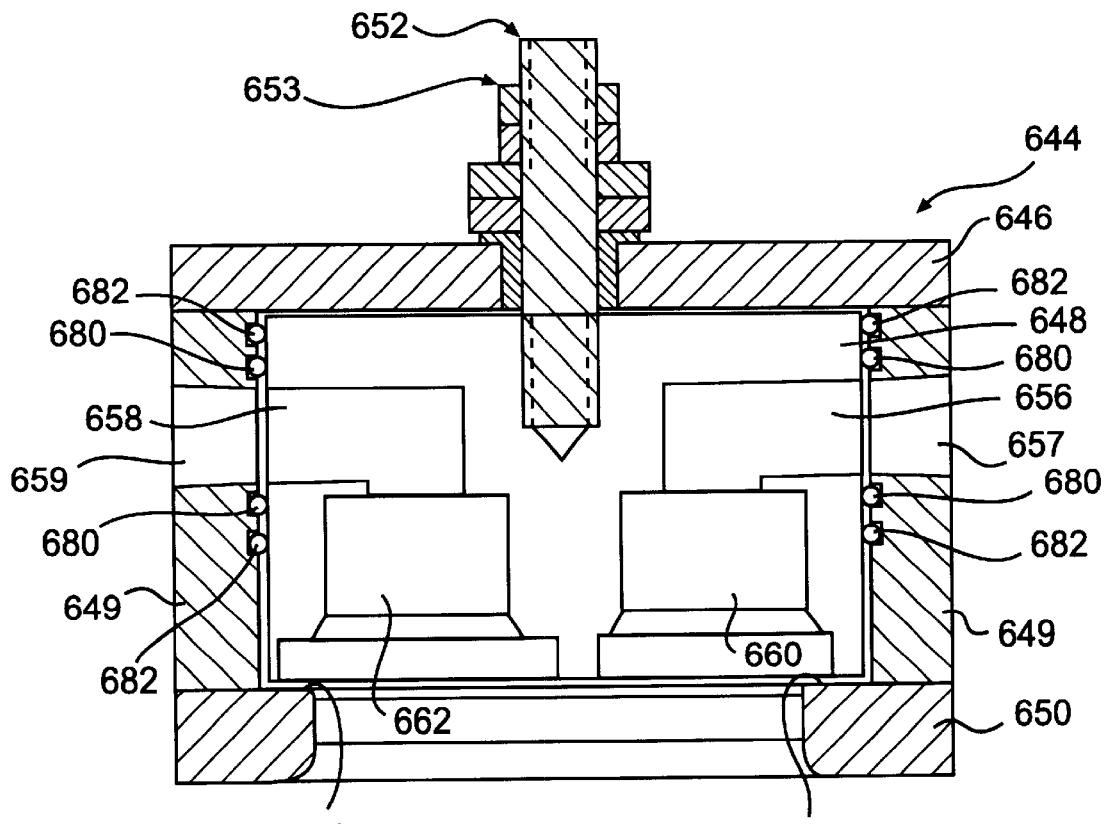
FIG. 55 is a cross-sectional side view illustration of the valve depicted in FIG. 52, shown along a plane disposed 90 degrees from the cross-sectional view shown in FIG. 54.
Figure 56:
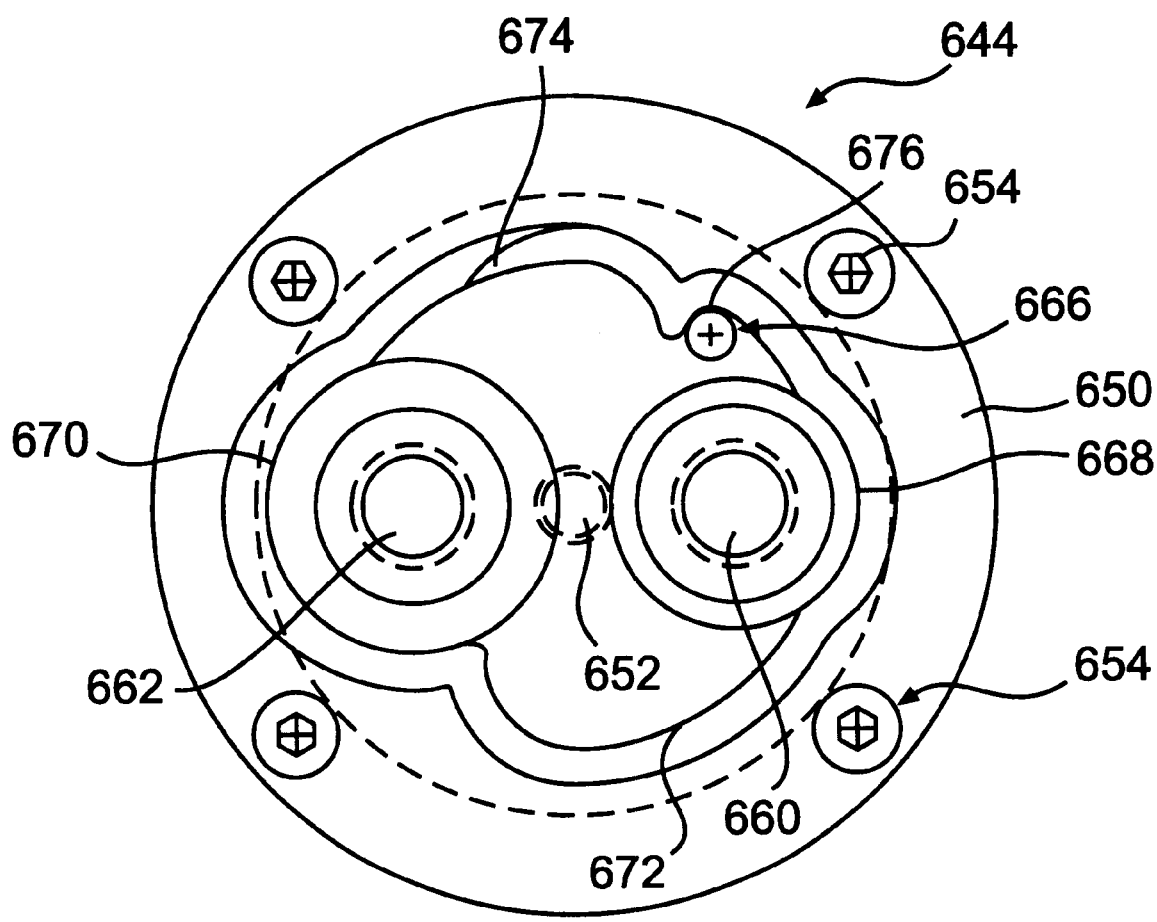
FIG. 56 is a bottom view of the valve illustrated in FIG. 52.

Cylindrical wall 649 is connected to both the fluid supply and discharge lines (not shown). As shown in FIG. 55, fluid inlet port 660 is connected fluidly to a fluid inlet port 656, which is shown as an elbow-shaped passage through receptacle disk 648. Similarly, fluid outlet port 662 is connected fluidly to a fluid outlet port 658, which is shown as an elbow-shaped passage through receptacle disk 648. Fluid inlet port 656 is connected fluidly to cylindrical wall inlet 657 that connects to the fluid supply line in a conventional manner (not shown). Fluid outlet port 658 is connected fluidly to cylindrical wall outlet port 659 that connects to the fluid discharge line in a conventional manner (not shown).

Cylindrical wall 649 is connected to both the fluid supply and discharge lines (not shown). As shown in FIG. 55, filter inlet port 660 is connected fluidly to a fluid inlet 656, which is shown as an elbow-shaped passage through receptacle disk 648. Similarly, filter outlet port 662 is connected fluidly to a fluid outlet 658, which is shown as an elbow-shaped passage through receptacle disk 648. Fluid inlet 656 is connected fluidly to cylindrical wall inlet 657 that connects to the fluid supply line in a conventional manner (not shown). Fluid outlet 658 is connected fluidly to cylindrical wall outlet 659 that connects to the fluid discharge line in a conventional manner (not shown).

Receptacle disk 548 is a cylindrically-shaped structure where the fluid inlet port 660 is configured to readily accept the configuration of the port identifier associated with the inlet port 36, for example. Similarly, fluid outlet port 662 is configured so that it readily accepts the configuration of the port identifier associated with filter outlet port 38. The configuration of fluid inlet port 660 and fluid outlet port 662 are such that filter 10, for example, will be correctly installed in every instance, It should be appreciated, however, that fluid inlet port 660 and fluid outlet port 662 may be configured to accept any of the configurations of the port identifiers that fall within the scope of the present invention.

Like lower plate 50, lower plate 650 acts to restrain filter 10 when inserted into valve 644. Lower plate 650 is circularly-shaped with a cammed opening 664 therethrough. A pin 666 extends from receptacle disk 648 into cammed opening 664 to act as a security stop for valve 644 to prevent over-rotation of receptacle disk 648.

The operation of valve 644 is very similar to that of valve 44, despite the differences therebetween. When inlet port 36 and outlet port 38 are inserted into fluid inlet port 660 and fluid outlet 662, receptacle disk 648 is positioned so that fluid inlet 656 does not align with circular wall inlet 657. Similarly, fluid outlet 658 is not aligned with circular wall outlet 659. This is the "off" position of valve 64.

Cammed opening 664 has an inlet portion 668 and an outlet portion 670 that are shaped to permit inlet flange 40 and outlet flange 42 to pass therethrough so that filter 10 can be inserted into or removed from valve 644. However, when receptacle disk 648 is turned 90 degrees to the "on" position, cammed opening 664 provides an inlet retention surface 672 and an outlet retention surface 674 that are not spaced as far from the center of lower plate 650 as inlet portion 668 and outlet portion 670. As a result, inlet retention surface 672 and outlet retention surface 674 prevent filter 10 from becoming dislodged from valve 644 during operation. As with valve 44, pin 666 abuts pin stop 676 when valve 644 is in the "off" position to prevent the over-rotation of receptacle disk 648 (and, consequently, to prevent the inlet and outlet ports from becoming misaligned with the supply and discharge lines of the filtration system.)

As described in connection with valve 44, upper plate 646 and receptacle disk 648 may be constructed from any suitable material such as aluminum or steel. Alternatively, they may be made from a suitable plastic or polymeric material such as polypropylene or ABS. Regardless of the material used for the construction of upper plate 646 and receptacle disk 648, it is preferred that lower disk 650 be made from polypropylene or ABS (or any other suitable plastic or polymeric material).

To provide a fluid-tight seal between receptacle disk 648 and cylindrical wall 649, o-rings 680, 682 are provided. O-rings 680 surround both fluid inlet 656 and fluid outlet 658. For superior fluidic sealing, second o-rings 682 are disposed around o-rings 680. As would be understood by those skilled in the art, however, any alternative arrangement of o-rings or seals may be used so long as valve 644 is prevented from leaking during operation.

As should be appreciated by those skilled in the art, the embodiments described above are not meant to limit the scope of the present invention. They are meant to be exemplary of the many embodiments and variations that are encompassed herein and that are claimed below.

What is claimed is:

1. A valve, comprising:
   an upper plate having an inlet port and an outlet port;
   a receptacle disk, rotatably connected by a connection structure to the upper plate, having an inlet port and an outlet port,
   wherein the receptacle disk inlet and outlet ports fluidly communicate with the upper plate inlet and outlet ports when the receptacle disk is in a first orientation with respect to the upper plate, and
   wherein the receptacle disk inlet and outlet ports do not fluidly communicate with the upper plate inlet and outlet ports when the receptacle disk is in a second orientation with respect to the upper plate; and
   a lower disk having at least one cammed surface therein, the cammed surface permitting access to the receptacle disk inlet and outlet ports when the receptacle disk is in the second orientation and preventing access to the receptacle inlet and outlet ports when the receptacle disk is in the first orientation.

2. The valve of claim 1, wherein the lower disk is connected to the upper plate in fixed relation thereto.

3. The valve of claim 1, wherein the receptacle disk further comprises:
   an inlet port identifier associated with the receptacle disk inlet port; and
   an outlet port identifier associated with the receptacle disk outlet port.

4. The valve of claim 3, wherein:
   the inlet port identifier comprises a first flange receiving portion with a first diameter; and
   the outlet port identifier comprises a second flange receiving portion with a second diameter.

5. The valve of claim 4, wherein the first diameter is greater than the second diameter.

6. The valve of claim 4, wherein the second diameter is greater than the first diameter.

7. The valve of claim 3, wherein:
   the inlet port identifier comprises a first flange receiving portion with a first shape; and
   the outlet port identifier comprises a second flange receiving portion with a second shape,
   wherein the first shape differs from the second shape.

8. The valve of claim 3, wherein:
   the inlet port identifier comprises a diameter of the receptacle disk inlet port; and
   the outlet port identifier comprises a diameter of the receptacle disk outlet port.

9. The valve of claim 8, wherein the diameter of the receptacle disk inlet port is greater than the diameter of the receptacle disk outlet port.

10. The valve of claim 8, wherein the diameter of the receptacle disk outlet port is greater than the diameter of the receptacle disk inlet port.

11. A valve, comprising:
    an upper plate having an inlet port and an outlet port;
    a receptacle disk having an inlet port and an outlet port; and
    a shaft coupled to said receptacle disk and said upper plate such that said receptacle disk is capable of being rotated with respect to said upper disk,
    wherein the receptacle disk inlet and outlet ports fluidly communicate with the upper plate inlet and outlet ports when the receptacle disk is in a first orientation with respect to the upper plate, and
    wherein the receptacle disk inlet and outlet ports do not fluidly communicate with the upper plate inlet and outlet ports when the receptacle disk is in a second orientation with respect to the upper plate; and
    a lower disk having at least one cammed surface therein, the cammed surface permitting access to the receptacle disk inlet and outlet ports when the receptacle disk is in the second orientation and preventing access to the receptacle inlet and outlet ports when the receptacle disk is in the first orientation.

12. A filter and valve assembly, comprising:
    a filter canister having
      a main body having a top,
      an inlet tube positioned on the main body,
      an outlet tube also positioned on the main body, offset from the inlet port by a predetermined distance,
      a filter cartridge, positioned within the main body, having an outlet
    end sealingly engaging the outlet port;
    a valve having
      an upper plate having an inlet port and an outlet port;
      a receptacle disk having an inlet port and an outlet port; and
      a shaft coupled to said receptacle disk and said upper plate such that said receptacle disk is capable of being rotated with respect to said upper disk,
      wherein the receptacle disk inlet and outlet ports fluidly communicate with the upper plate inlet and outlet ports when the receptacle disk is in a first orientation with respect to the upper plate, and
      wherein the receptacle disk inlet and outlet ports do not fluidly communicate with one another when the receptacle disk is in a second orientation with respect to the upper plate, and a lower disk having at least one cammed surface therein, the cammed surface permitting access to the receptacle disk inlet and outlet ports when the receptacle disk is in the second orientation and preventing access to the receptacle inlet and outlet ports when the receptacle disk is in the first orientation;

an inlet port identifier associated with the filter canister inlet port and the receptacle disk inlet port, wherein the inlet port identifier permits the filter canister inlet port to fluidly engage the receptacle disk inlet port; and an outlet port identifier associated with the filter canister outlet port and the receptacle disk outlet port, wherein the outlet port identifier permits the filter canister outlet port to fluidly engage the receptacle disk outlet port.

* * * * *